United States Patent
Canonne-Velasquez et al.

(10) Patent No.: US 12,160,379 B2
(45) Date of Patent: Dec. 3, 2024

(54) ENHANCEMENTS OF PHYSICAL CHANNELS IN MULTI-TRP

(71) Applicant: INTERDIGITAL PATENT HOLDINGS, INC., Wilmington, DE (US)

(72) Inventors: Loic Canonne-Velasquez, Dorval (CA); Young Woo Kwak, Woodbury, NY (US); Afshin Haghighat, Ile-Bizard (CA); Moon-il Lee, Melville, NY (US); Tuong Duc Hoang, Montreal (CA); Paul Marinier, Brossard (CA); Virgil Comsa, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 127 days.

(21) Appl. No.: 17/917,979

(22) PCT Filed: Apr. 7, 2021

(86) PCT No.: PCT/US2021/026241
§ 371 (c)(1),
(2) Date: Oct. 10, 2022

(87) PCT Pub. No.: WO2021/207402
PCT Pub. Date: Oct. 14, 2021

(65) Prior Publication Data
US 2023/0147122 A1 May 11, 2023

Related U.S. Application Data

(60) Provisional application No. 63/006,977, filed on Apr. 8, 2020, provisional application No. 63/061,281, filed (Continued)

(51) Int. Cl.
*H04W 4/00* (2018.01)
*H04L 1/08* (2006.01)
*H04L 5/00* (2006.01)

(52) U.S. Cl.
CPC .............. *H04L 5/0035* (2013.01); *H04L 1/08* (2013.01); *H04L 5/005* (2013.01)

(58) Field of Classification Search
USPC .................................................. 370/329, 330
See application file for complete search history.

(56) References Cited

U.S. PATENT DOCUMENTS

| 2021/0144720 | A1* | 5/2021 | Xu | ........................ H04L 5/0051 |
| 2022/0167336 | A1* | 5/2022 | Matsumura | ........... H04W 72/21 |

(Continued)

OTHER PUBLICATIONS

3rd Generation Partnership Project (3GPP), R1-1813329, "Enhanced UL Transmission with Configured Grant for URLLC", NTT DoCoMo, Inc., 3GPP TSG RAN WG1 Meeting #95, Spokane, USA, Nov. 12-16, 2018, 16 pages.

(Continued)

*Primary Examiner* — Chuong T Ho
(74) *Attorney, Agent, or Firm* — Condo Roccia Koptiw LLP

(57) ABSTRACT

Systems, methods, and instrumentalities are described herein regarding enhancements of physical channels in Multi-TRP. Reliability enhancements are provided for physical downlink control channel (PDCCH), including, for example, enhanced support for a control resource set (CORESET) combining. Reliability enhancements are provided for physical uplink control channel (PUCCH), including, for example, activation/deactivation of repetition combining, resource selection, etc. Reliability enhancements are provided for physical uplink shared channel (PUSCH), including, for example, spatial relation determination and signaling, configured and dynamic grant enhancements, etc.

8 Claims, 13 Drawing Sheets

Related U.S. Application Data on Aug. 5, 2020, provisional application No. 63/091,545, filed on Oct. 14, 2020, provisional application No. 63/136,306, filed on Jan. 12, 2021.

(56) References Cited

U.S. PATENT DOCUMENTS

| | | |
|---|---|---|
| 2022/0393823 A1 | 12/2022 | Fan |
| 2023/0076139 A1 | 3/2023 | Muruganathan et al. |
| 2023/0077264 A1 | 3/2023 | Gao et al. |
| 2023/0093264 A1* | 3/2023 | Gao ............... H04W 52/16 370/329 |
| 2023/0147122 A1 | 5/2023 | Canonne-velasquez et al. |
| 2023/0209386 A1* | 6/2023 | Khoshkholgh Dashtaki ............... H04W 24/10 370/350 |
| 2024/0039587 A1* | 2/2024 | Liu ............... H04B 7/0456 |

OTHER PUBLICATIONS

3rd Generation Partnership Project (3GPP), R1-1906225, "Discussion on Multi-Beam Enhancement", NTT DoCoMo, Inc., 3GPP TSG RAN WG1 #97, Reno, USA, May 13-17, 2019, 24 pages.

3rd Generation Partnership Project (3GPP), TS 38.214 V16.0.0, "Technical Specification Group Radio Access Network, NR, Physical Layer Procedures for Data (Release 16)", Dec. 2019, pp. 1-147.

* cited by examiner

ENHANCEMENTS OF PHYSICAL CHANNELS IN MULTI-TRP

CROSS-REFERENCE TO RELATED APPLICATIONS

This application is the National Stage Entry under 35 U.S.C. § 371 of Patent Cooperation Treaty Application No. PCT/US2021/026241, filed Apr. 7, 2021, which claims the benefit of Provisional U.S. Patent Application No. 63/006,977, filed Apr. 8, 2020, Provisional U.S. Patent Application No. 63/061,281, filed Aug. 5, 2020, Provisional U.S. Patent Application No. 63/091,545, filed Oct. 14, 2020, and Provisional U.S. Patent Application No. 63/136,306, filed Jan. 12, 2021, the disclosure of which is incorporated herein by reference in its entirety.

BACKGROUND

Mobile communications using wireless communication continue to evolve. A fifth generation may be referred to as 5G. A previous (legacy) generation of mobile communication may be, for example, fourth generation (4G) long term evolution (LTE).

SUMMARY

Systems, methods, and instrumentalities are disclosed herein associated with enhancements of physical channels in multi-transmission/reception point (MTRP) operations. Reliability enhancements may be provided for a physical downlink control channel (PDCCH), including, for example, enhanced support for a control resource set (CORESET) combining. Reliability enhancements for a PDCCH may comprise enhancements to determining downlink control information (DCI) repetition timing, determining a transmission configuration indicator (TCI) selection for data scheduled with DCI repetitions, determining PDCCH candidates from multiple beams, and detecting PDCCH decoding failure and related behavior including channel state information (CSI) feedback. Reliability enhancements may be provided for a physical uplink control channel (PUCCH), including, for example, activation/deactivation of repetition combining, resource selection, a spatial filter configuration table for repetitions, and multiplexing if overlapping with a physical uplink shared channel (PUSCH). Reliability enhancements may be provided for a PUSCH, including, for example, spatial relation determination and signaling, configured and dynamic grant enhancements, and spatial filter configuration and repetition transmissions based on DCI field values and/or a spatial filter configuration table.

A wireless transmit/receive unit (WTRU) may be used in enhanced transmissions in MTRP operations. The WTRU may receive SRI information, e.g., which may include sets of SRI patterns. The WTRU may receive a DCI associated with uplink scheduling information. The DCI may indicate a number of transmission repetitions, a redundancy value, and/or a spatial domain resource allocation (SDRA) indicator. The WTRU may determine a sounding reference signal resource indicator (SRI) pattern, e.g., from a set of SRI patterns. The WTRU may determine the SRI pattern based on the SDRA indicator, the number of repetitions, and/or the redundancy value. An SRI pattern may be associated with a sequence of SRIs. The WTRU may determine (e.g., based on the SRI pattern) spatial relations for repetition transmissions (e.g., PUSCH repetition transmissions). The WTRU may determine the spatial relations for repetition transmissions based on the sequence of SRIs (e.g., a first repetition transmission uses the first SRI in the sequence, a second repetition transmission uses the second SRI in the sequence, and so on). The WTRU may send the repetition transmissions (e.g., PUSCH repetition transmissions) using the determined spatial relations. The WTRU may determine a transmit time associated with a repetition transmission (e.g., PUSCH repetition transmission), for example, based on an offset value (e.g., a K2 value).

A wireless/transmit unit (WTRU) may determine, in connection with a PUSCH/PUCCH transmission, whether to employ a single or multi-TRP mode of operation. The WTRU may determine spatial filter configurations based on dynamic switching between single and multi-TRP modes.

DETAILED DESCRIPTION

Figure 1A:
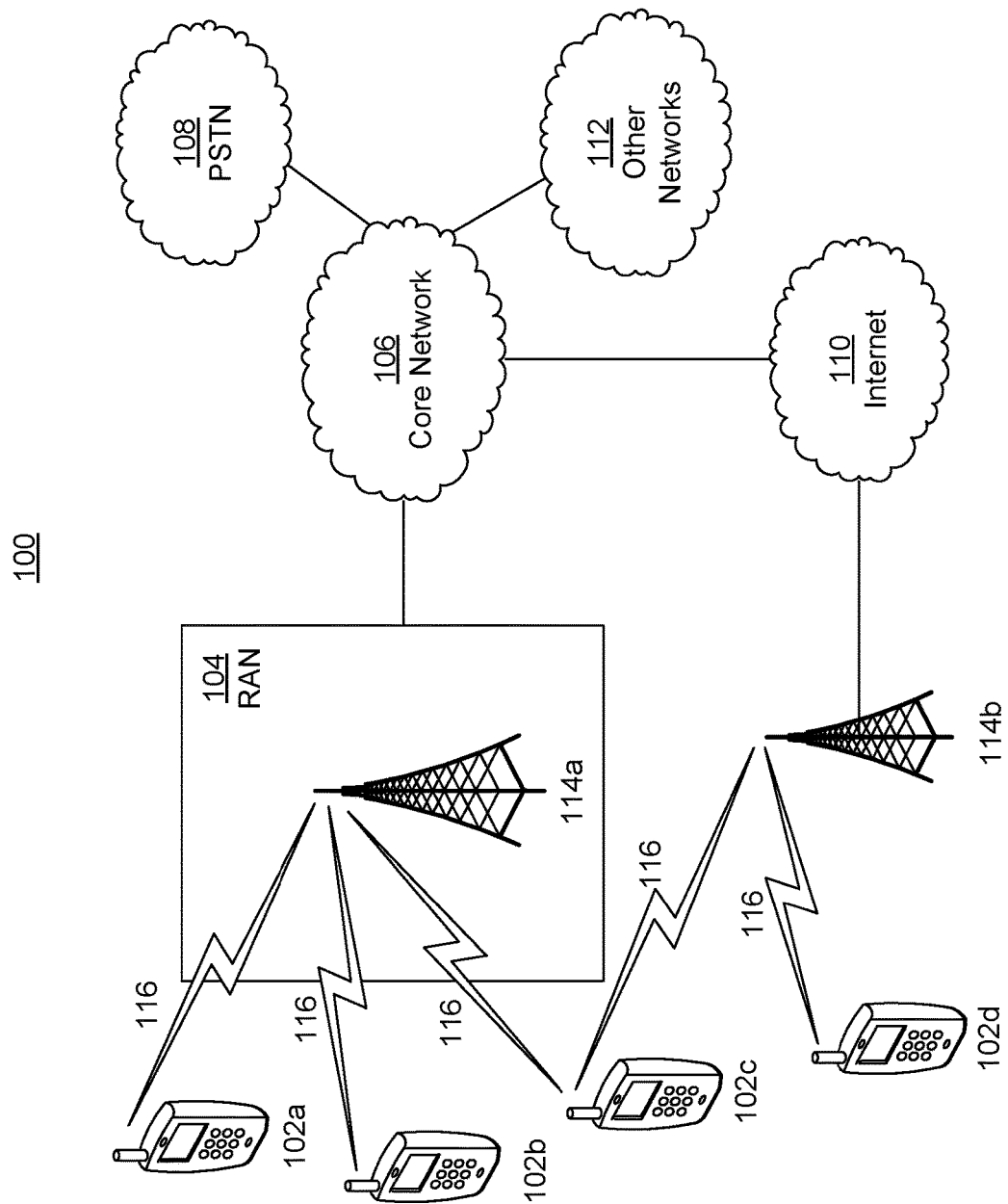
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform (DFT)-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c, and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B (eNB), a Home Node B, a Home eNode B, a gNode B (gNB), a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
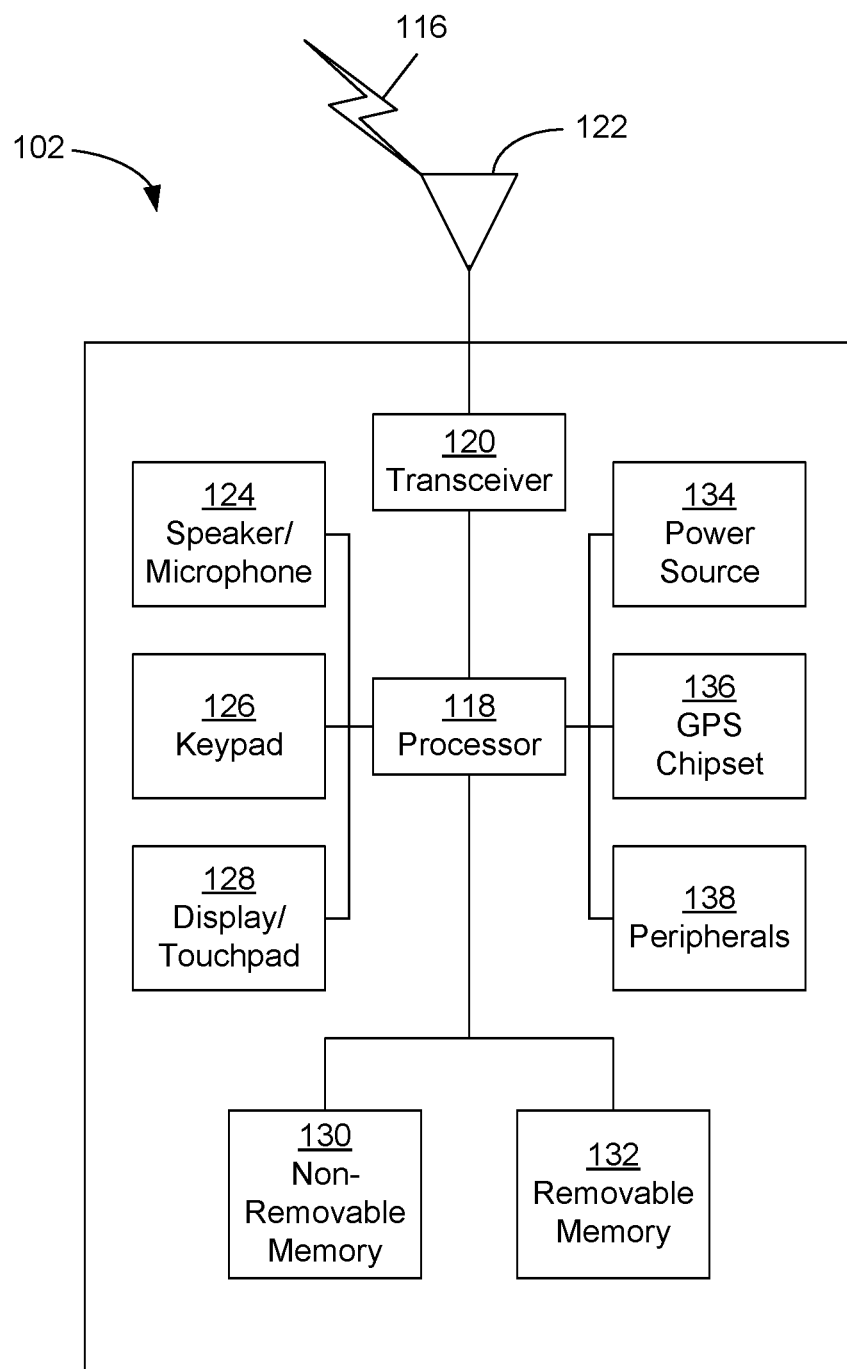
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
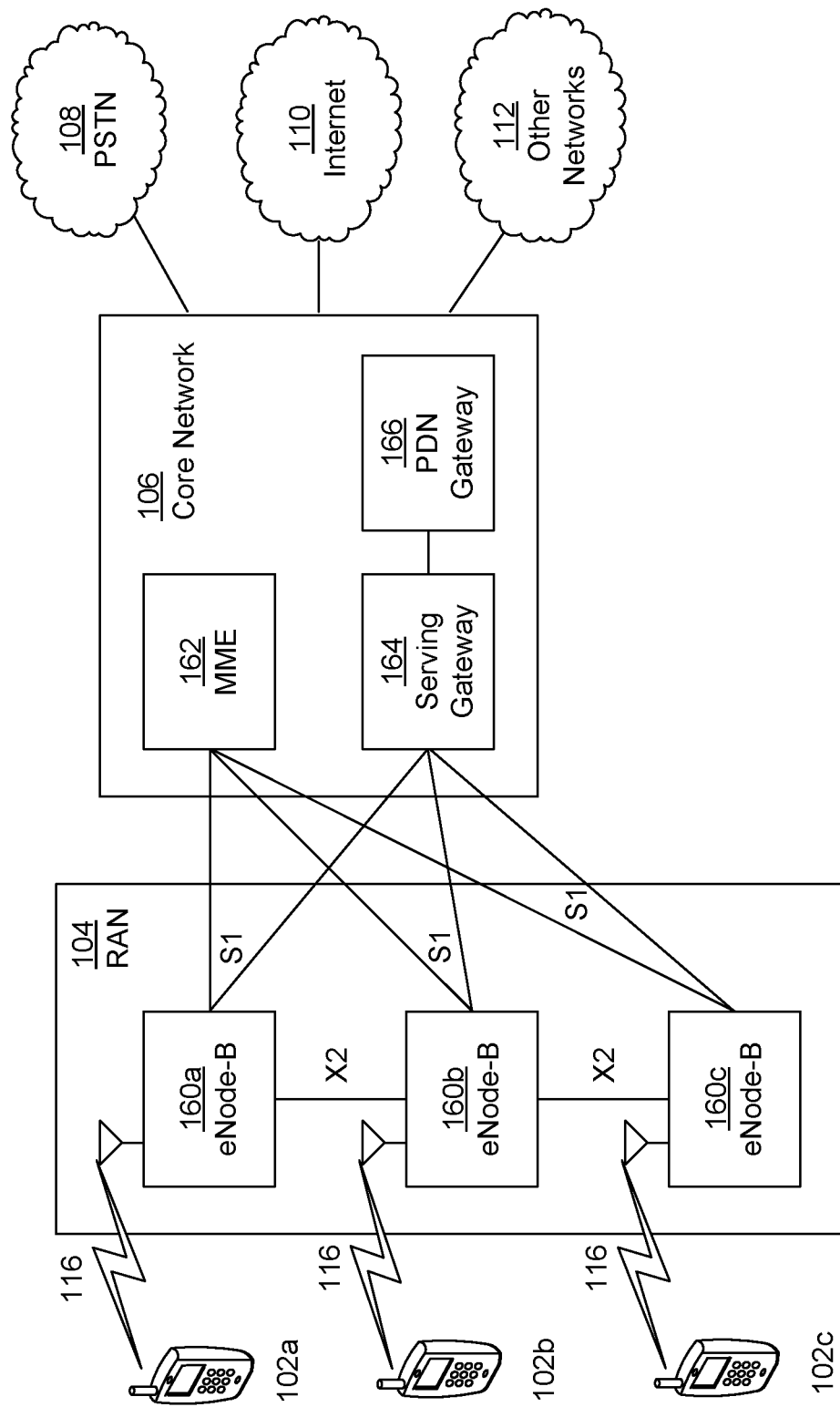
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11 ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11 ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11 ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
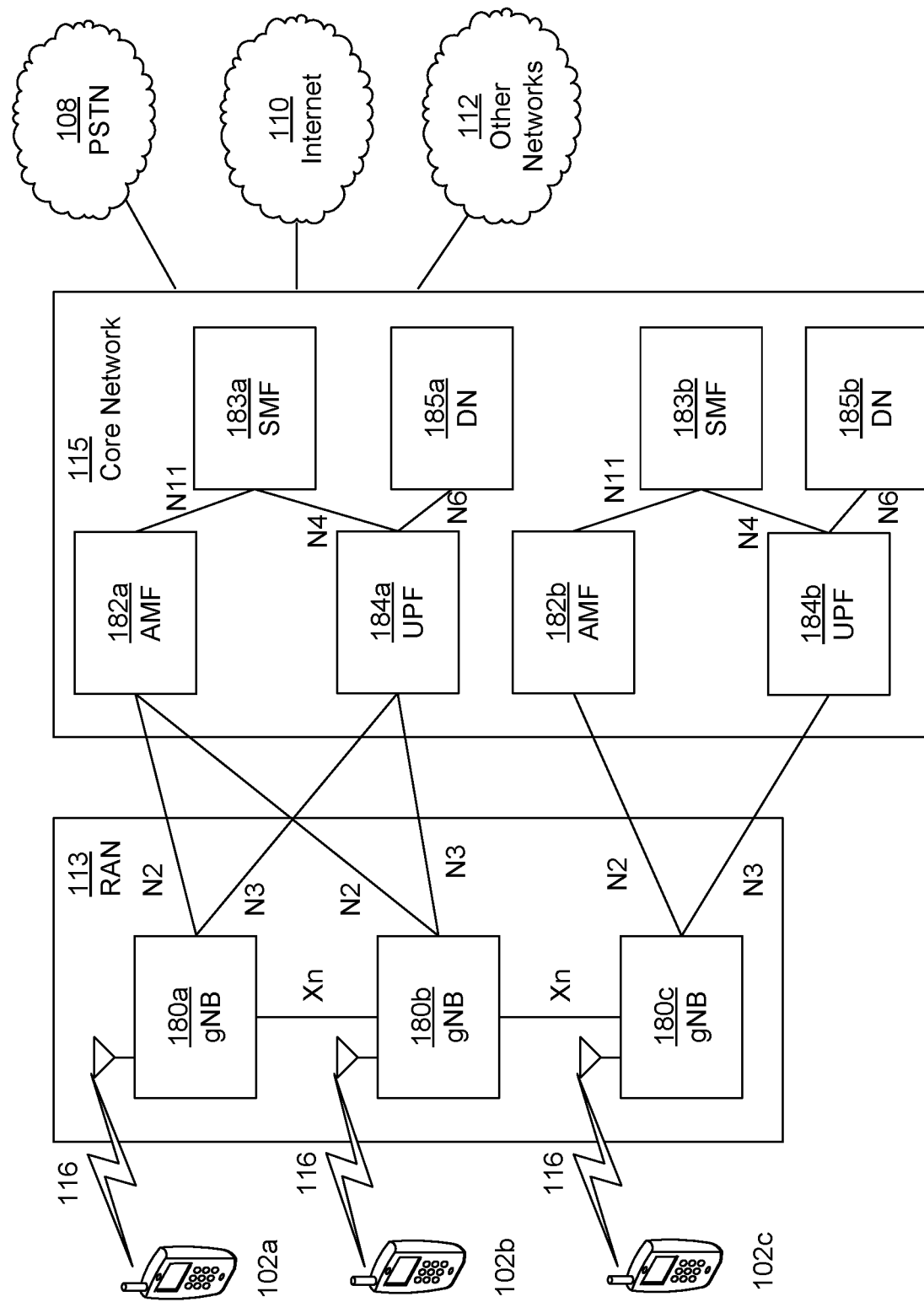
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Systems, methods, and instrumentalities are disclosed herein associated with enhancements of physical channels in multi-transmission/reception point (MTRP) operations. Reliability enhancements may be provided for a physical downlink control channel (PDCCH), including, for example, enhanced support for a control resource set (CORESET) combining. Reliability enhancements for a PDCCH may comprise enhancements to determining downlink control information (DCI) repetition timing, determining a transmission configuration indicator (TCI) selection for data scheduled with DCI repetitions, determining PDCCH candidates from multiple beams, and detecting PDCCH decoding failure and related behavior including channel state information (CSI) feedback. Reliability enhancements may be provided for a physical uplink control channel (PUCCH), including, for example, activation/deactivation of repetition combining, resource selection, a spatial filter configuration table for repetitions, and multiplexing if overlapping with a physical uplink shared channel (PUSCH). Reliability enhancements may be provided for a PUSCH, including, for example, spatial relation determination and signaling, configured and dynamic grant enhancements, and spatial filter configuration and repetition transmissions based on DCI field values and/or a spatial filter configuration table.

A wireless transmit/receive unit (WTRU) may be used in enhanced transmissions in MTRP operations. The WTRU may receive SRI information, e.g., which may include sets of SRI patterns. The WTRU may receive a DCI associated with uplink scheduling information. The DCI may indicate a number of transmission repetitions, a redundancy value, and/or a spatial domain resource allocation (SDRA) indicator. The WTRU may determine a sounding reference signal resource indicator (SRI) pattern, e.g., from a set of SRI patterns. The WTRU may determine the SRI pattern based on the SDRA indicator, the number of repetitions, and/or the redundancy value. An SRI pattern may be associated with a sequence of SRIs. The WTRU may determine (e.g., based on the SRI pattern) spatial relations for repetition transmissions (e.g., PUSCH repetition transmissions). The WTRU may determine the spatial relations for repetition transmissions based on the sequence of SRIs (e.g., a first repetition transmission uses the first SRI in the sequence, a second repetition transmission uses the second SRI in the sequence, and so on). The WTRU may send the repetition transmissions (e.g., PUSCH repetition transmissions) using the determined spatial relations. The WTRU may determine a transmit time associated with a repetition transmission (e.g., PUSCH repetition transmission), for example, based on an offset value (e.g., a K2 value).

A wireless/transmit unit (WTRU) may determine, in connection with a PUSCH/PUCCH transmission, whether to employ a single or multi-TRP mode of operation. The WTRU may determine spatial filter configurations based on dynamic switching between single and multi-TRP modes.

Multi-transmission/reception point (MTRP) operation may be supported (e.g., in new radio (NR)). A WTRU may receive and process a physical downlink control channel (PDCCH) and physical downlink shared channels (PDSCHs) transmissions. In examples, the channel transmissions described herein, such as PDCCH and PDSCH transmissions, may be NR transmissions, e.g., NR-physical downlink control channel and NR-physical downlink shared channel transmissions. References herein to a channel, e.g., a PDCCH, PDSCH, PUCCH, PUSCH, etc., may refer to a channel transmission (e.g., a received or sent channel transmission).

Figure 2:
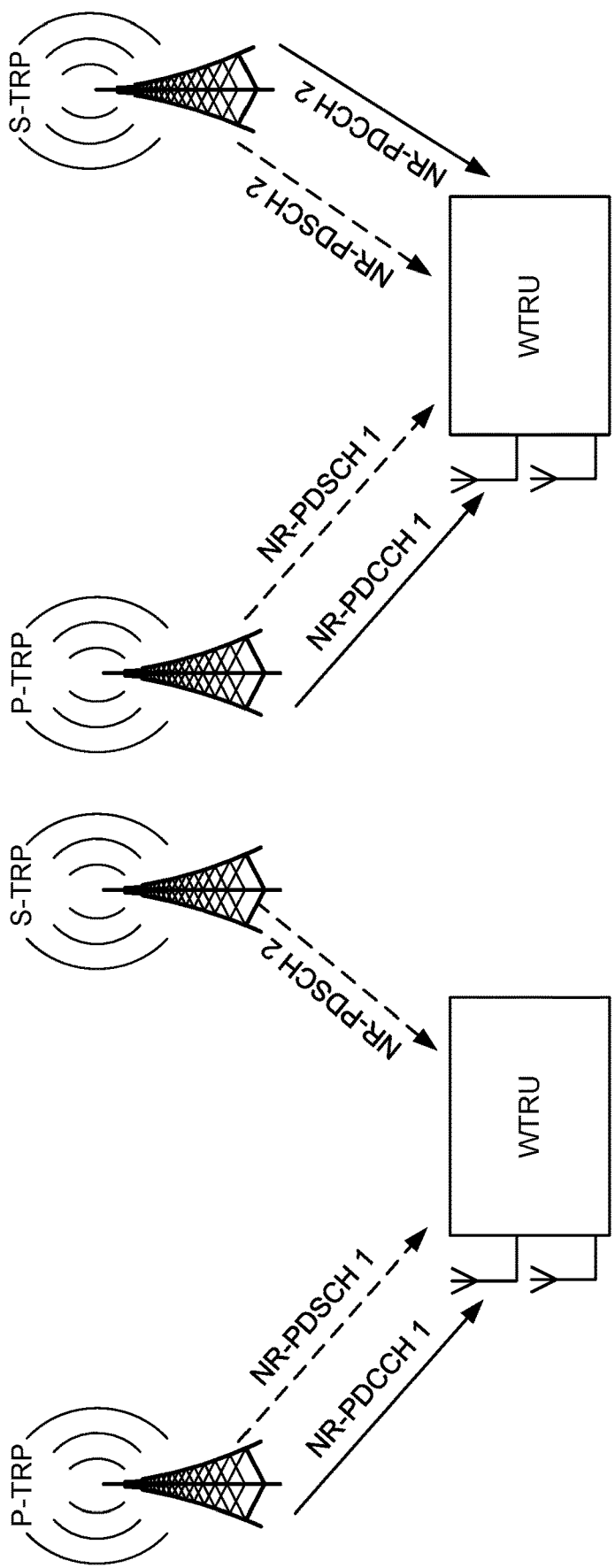
FIG. 2 is a diagram illustrating an example of single and multi-DCI MTRP configurations.

FIG. 2 is a diagram illustrating examples of single and multi-downlink control information (DCI) MTRP configurations. FIG. 2 shows two example scenarios of downlink MTRP operations with a primary TRP (P-TRP) and a secondary TRP (S-TRP). In a first example scenario (e.g., scenario 1), a single PDCCH may schedule a single PDSCH, where separate layers may be transmitted from separate TRPs. In a second example scenario (e.g., scenario 2), multiple PDCCHs may schedule (e.g., may each schedule) a respective PDSCH, where an PDSCH (e.g., each PDSCH) may be transmitted from a separate TRP. NR may support a limited number of PDSCHs and/or PDCCHs. In examples, the maximum number of PDSCHs may be two and the maximum number of PDCCHs may be two.

Multi-TRP transmission may be implemented, for example, for a downlink (DL) shared data channel, e.g., for enhanced mobile broadband (eMBB) and ultra-reliable low latency (URLLC) scenarios. Multiple transmission schemes (e.g., four transmission schemes) for a PDSCH may enhance reliability and robustness of downlink data transmission (e.g., for URLLC). Additional resources may be used in spatial, frequency, and time domains, for example, to support the transmission schemes. The additional resources may be used, for example, to enable a lower code rate for transmission and/or to support repetition of an original transmission (e.g., depending on the transmission scheme).

Frequency range 1 (FR1) and range 2 (FR2) operations may be enhanced. Reliability and robustness enhancements for a PDSCH may be extended for other physical channels (e.g., a PDCCH, a physical uplink shared channel (PUSCH) and/or physical uplink control channels (PUCCH). Enhancements may use multi-TRP and/or multi-panel capabilities. Quasi co-location (QCL) and/or transmission configuration indicator (TCI)-related enhancements may enable inter-cell MTRP with multiple-DCI based multi-PDSCH. Beam management may be enhanced. Multiple-input multiple output (MIMO) may be applied to MTRP to support, for example, a high speed train (HST) scenario in a single frequency network (SFN).

Figure 3:
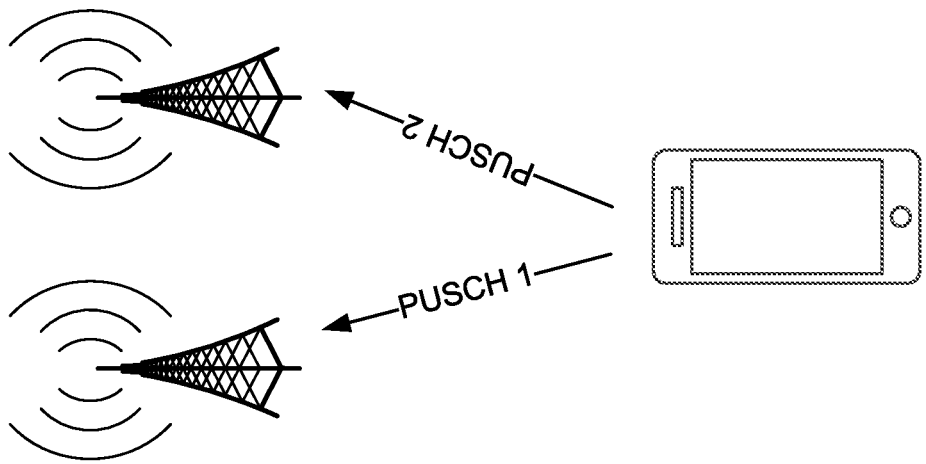
FIG. 3 is a diagram illustrating an example of multi-TRP enhancements to physical channels.
Figure 3:
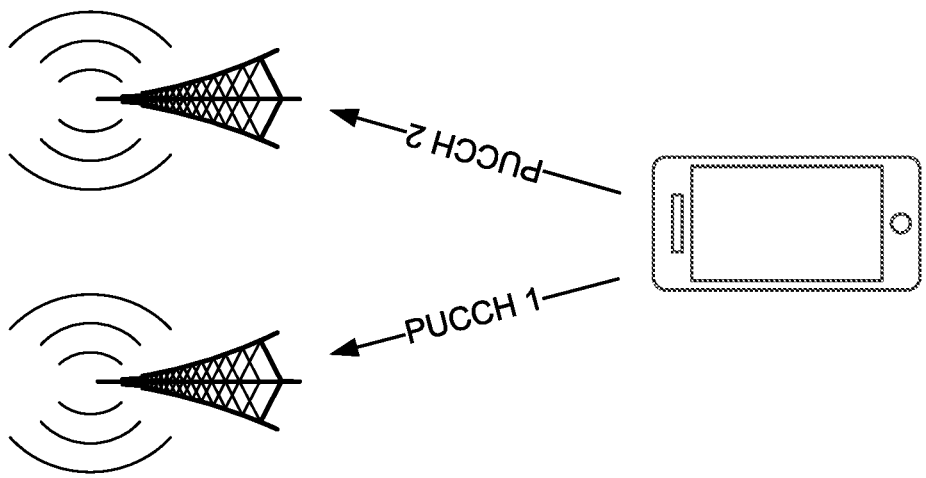
Figure 3:
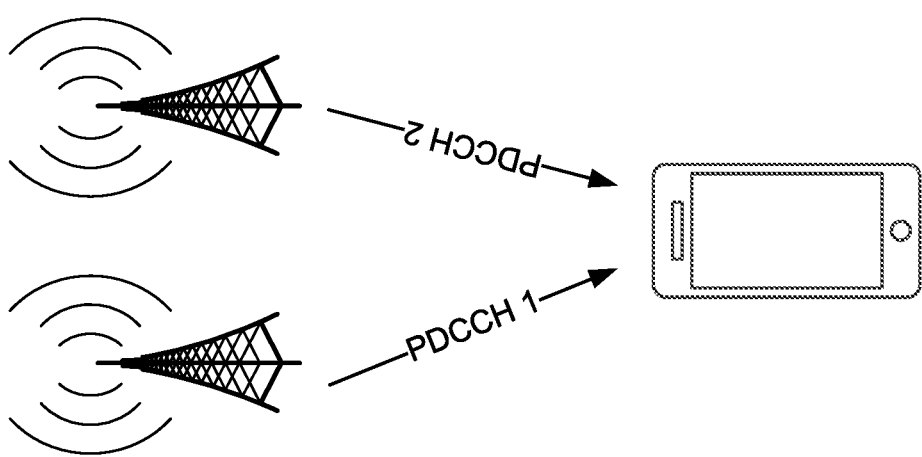

Reliability enhancements are disclosed for physical channels (e.g., PDCCH, PUCCH, and PUSCH), for example, as shown in FIG. 3.

FIG. 3 is a diagram illustrating an example of multi-TRP enhancements to physical channels (e.g., PDCCH, PUCCH, and/or PUSCH). In an example (e.g., a single TRP system), physical channels may be transmitted through a channel with poor channel conditions, e.g., which may degrade reception performance. A connection between a WTRU and a TRP may fail, for example, due to WTRU rotation and/or blockage. Robustness of the physical channels may be enhanced. For example, multiple TRPs may be used for the transmission of a PDCCH and/or for the reception of a PUCCH and/or PUSCH, e.g., to provide diversity. Multiple copies may be transmitted. More than one TRP may be involved in a downlink (DL) transmission or a reception of an uplink (UL) transmission. Repetitions may be combined, for example, to provide a combining gain. Repetitions may allow reception of one of multiple copies, e.g., if one or more other copies fail to reach a destination, which may enhance reception performance.

A property of a grant may include, for example, one or more of the following: a frequency allocation; an aspect of time allocation (e.g., a duration); a priority; a modulation and coding scheme (MCS); a transport block (TB) size; a number of spatial layers; a number of transport blocks (TBs); a TCI state, a channel state information reference signal (CSI-RS) resource indicator (CRI) or sounding reference signal (SRS) resource index (SRI); a number of repetitions; and/or an indication whether a grant is a configured grant type 1, type 2, or a dynamic grant.

PDCCH enhancements disclosed herein may be implemented.

CORESET may be used interchangeably with search space, PDCCH search space, PDCCH, PDCCH candidate, PDCCH decoding candidate, and/or PDCCH monitoring set. Identity, ID, and index may be used interchangeably. Joint coding of CORESETs may be referred to as bit-level and/or symbol level combining of one or more of the following: one or more bits (e.g., soft or hard bits) from different CORESETs or PDCCHs; one or more modulation symbols from different CORESETs or PDCCHs; and/or one or more DCIs from different CORESETs or PDCCHs.

A PDCCH may be associated with a TRP. A WTRU may be configured with one or more CORESETs and PDCCH search spaces for a bandwidth part (BWP). A CORESET (e.g., each CORESET) and/or a PDCCH search space (e.g., each PDCCH search space) may be associated with a TRP. A TRP may be referred to as a TRP identity. A TRP identity (TRP-id) may be used interchangeably with a CORESET group, CORESET group identity, CORESET pool, CORESET pool identity (CORESETPoolId), PDCCH search space group, PDCCH search space group identity, PDCCH search space pool, PDCCH search space pool identity (searchSpacePoolId), QCL group identity, and/or TRP group identity. PDCCH search space may be used interchangeably with search space (SS).

A TRP or TRP identity for a CORESET and/or a PDCCH search space may be determined based on one or more of the following examples. In examples, a TRP identity may be indicated, e.g., in a configuration for a CORESET and/or a search space. A TRP identity may be present in a configuration, for example, if a WTRU is configured to operate a mode of operation for multi-TRP PDCCH monitoring. In examples, one or more QCL parameters may be indicated or configured, e.g., for a CORESET and/or a search space. The CORESETs and/or search spaces may have the same QCL association and may be considered to have the same TRP association. The same QCL association may be, for example, the same source reference signal, which may be used for one or more QCL parameters.

A WTRU may determine a mode of operation, e.g., for PDCCH reception. One or more modes of operation may be used for PDCCH reception. A first mode of operation may be based on a single-PDCCH reception. A second mode of operation may be based on multi-PDCCH reception. A WTRU may monitor, receive, and/or attempt to decode a single PDCCH, which may carry scheduling information for one or more PDSCHs and/or one or more PUSCHs. A WTRU may (e.g., for multi-PDCCH reception), monitor, receive, and/or attempt to decode one or more PDCCHs, which may carry scheduling information for one or more PDSCHs and/or one or more PUSCHs. There may be multiple modes, such as one or more of following. Mode-1 may be a single-PDCCH decoding mode (e.g., decoding a single PDCCH to receive a single DCI). In Mode-1a a single PDCCH may schedule a single PDSCH and/or a single PUSCH. In Mode-1b a single PDCCH may schedule one or more PDSCHs. Mode-2 may be, for example, a multi-PDCCH decoding mode (e.g., decoding multiple PDCCHs to receive a single DCI). In Mode-2a one or more PDCCHs may schedule a single PDSCH and/or a single PUSCH. In Mode-2b one or more PDCCHs may schedule one or more PDSCHs.

A PDCCH may be a PDCCH candidate in a search space. A single PDCCH may be referred to as a PDCCH candidate carrying a DCI or as a DCI, e.g., a single PDCCH may refer to time/frequency resources of one PDDCH candidate or it may refer to DCI bits. A PDSCH or PUSCH may be referred to as a transport block (e.g., a shared channel).

PDCCH decoding mode, PDCCH decoding type, PDCCH decoding scheme, PDCCH reception mode, PDCCH reception type, PDCCH reception scheme, PDCCH monitoring mode, PDCCH monitoring type, and PDCCH monitoring scheme may be used interchangeably.

The number of CORESETs for decoding multiple PDCCHs may be determined, for example, based on the mode of operation. One or more of the following may apply.

A mode of operation may be determined, for example, based on the number of CORESETs in a CORESET group. In examples, a WTRU may consider a CORESET group as a first mode of operation (e.g., multi-PDCCH decoding), for example, if the CORESET group comprises two or more CORESETs. A WTRU may consider a CORESET group as a second mode of operation (e.g., single-PDCCH decoding), for example, if the CORESET group comprises zero or one CORESET.

A mode of operation may be determined, for example, based on the number of associated CORESETs (e.g., for a DCI reception). In examples, a WTRU may consider associated CORESETs as a first mode of operation (e.g., multi-PDCCH decoding), for example, if two or more CORESETs are associated. A WTRU may consider a lack of associated CORESETs (e.g., zero or one CORESET or multiple CORESETs that are not associated) as a second mode operation (e.g., single-PDCCH decoding). The number of associated CORESETs for a DCI may be indicated, for example, implicitly, e.g., based on the number of search spaces associated with a different CORESET-id configured for monitoring the DCI.

A mode of operation may be determined, for example, based on a WTRU capability and a gNB configuration based on WTRU capability reporting. For example, a WTRU may receive a PDCCH decoding type or mode indication (e.g., single-PDCCH decoding mode or multi-PDCCH decoding mode). A WTRU may decode a DCI based on multiple PDCCHs, for example, if the PDCCH decoding type or mode indication indicates multi-PDCCH decoding. A WTRU may decode a DCI based on single-PDCCH, for example, if the PDCCH decoding type indication indicates single-PDCCH decoding or no PDCCH decoding type is indicated.

A WTRU may request a preferred mode of operation, e.g., for PDCCH decoding. A WTRU may indicate (e.g., to a gNB) a preferred mode of operation, for example, if a WTRU does not support multiple (e.g., both) modes of operation and/or decoding of a DCI based on a CORESET fails. In examples, a WTRU may be configured with one or more uplink resources (e.g., physical random access channel (PRACH), PUCCH and/or PUSCH) that may be used by the WTRU to indicate a preferred mode of operation. A WTRU may transmit one or more uplink signals (e.g., based on a first uplink resource of the one or more uplink resources), for example, if a decoding of a DCI based on a CORESET fails. A WTRU may transmit one or more uplink signals (e.g., based on a second uplink resource), for example, if a decoding of a DCI based on a CORESET is successful. A first uplink resource and a second uplink resource may be identical. The indication may be based on toggle, e.g., if the first uplink resource and the second uplink resource are identical). In examples, a transmission of an uplink signal on the first uplink resource may indicate a request for a second mode of operation (e.g., single-PDCCH decoding), for example, if the WTRU is configured with a first mode of operation (e.g., multi-PDCCH decoding). A transmission of an uplink signal on a first uplink resource may indicate a request for a first mode of operation, for example, if a WTRU is configured with a second mode of operation.

A mode of operation may be determined, for example, based on a configuration of a CORESET and/or search space. In examples, a mode of operation may be determined, for example, based on the number of TRP-ids configured for CORESETs configured in a BWP. A first mode of operation may be used, for example, if the number of TRP-ids is 1. A second mode of operation may be used otherwise. In examples, a first mode of operation may be used if a TRP-id is not configured and/or is not present for a CORESET configuration. A second mode of operation may be used if a TRP-id is configured for a CORESET configuration. In examples, QCL association information may determine a mode of operation. A first mode of operation may be used, for example, if a QCL association is the same for multiple (e.g., all) configured CORESETs. A second mode of operation may be used, for example, if a QCL association is different across multiple (e.g., all) CORESETs. One or more of following may apply. A TRP-id may be present in a CORESET/SS configuration, for example, based on the mode of operation to use for PDCCH reception. QCL association may be configured commonly for multiple (e.g., all) CORESETs/SSs for a first mode of operation. QCL association may be configured individually or separately for each of multiple (e.g., all) CORESET/SS for a second mode of operation. A QCL association may be referred to as a QCL type configuration.

A mode of operation may be determined based on a dynamic indication. For example, a DCI in a common search space may indicate a mode of operation of PDCCH reception (e.g., a PDCCH reception mode) in one or more WTRU-specific search spaces. A DCI in a common search space may be a group common DCIA group common DCI may be shared by a group of WTRUs. A group common DCI may be cyclic redundancy check (CRC) scrambled, for example, with a group radio network temporary identifier (RNTI). A start time of a PDCCH reception mode indicated in a group common DCI may be X symbols or slots after the last symbol or slot of the PDCCH carrying the group common DCI. The X may be determined, for example, based on subcarrier spacing of an associated BWP and/or WTRU capability (e.g., WTRU capability of processing). A DCI in a (e.g., the same) search space may indicate activation/deactivation of a PDCCH reception mode (e.g., mode-2). In examples, a default PDCCH reception mode (e.g., mode-1) may be used, for example, if a PDCCH reception mode is deactivated or is not activated and an indicated PDCCH reception mode (e.g., mode-2) may be used, for example, if a PDCCH reception mode is activated. A DCI may be used interchangeably with a medium access control (MAC) control element (CE) (e.g., a DCI and a MAC CE may perform the same function).

Multi-PDCCH reception/decoding schemes may be implemented. One or more multi-PDCCH decoding schemes may be used. One or more PDCCHs (e.g., which may be PDCCH transmissions as used herein), for example PDCCH candidates, received (e.g., by a WTRU) in a multi-PDCCH reception scheme may be overlapped in the time and/or frequency domains. One or more PDCCHs in multi-PDCCH modes, e.g., for receiving one or more PDSCHs or PUSCHs, may be referred to as a multi-PDCCH set ($M_{PDCCH}^{set}$). One or more PDCCH or PDCCH candidates in a $M_{PDCCH}^{set}$ may be combined (e.g., in bit level or symbol level) and may be used to decode an associated DCI.

PDCCHs may be overlapped (e.g., fully overlapped) in the time and frequency domains (e.g., spatial domain multiplexing (SDM)). One or more PDCCHs in a $M_{PDCCH}^{set}$ may be from different CORESETs or non-overlapped CORESETs. For example, a first PDCCH in a $M_{PDCCH}^{set}$ may be from a first CORESET and a second PDCCH in the $M_{PDCCH}^{set}$ may be from a second CORESET.

In examples, CORESETs associated with one or more PDCCHs in a $M_{PDCCH}^{set}$ may be configured with a number of symbols (e.g., a same number of symbols) and a frequency location (e.g., a same frequency location), e.g., same physical resource block (PRB) set in a BWP. A first PDCCH in a $M_{PDCCH}^{set}$ may be from a first search space, which may be associated with a first CORESET. A second PDCCH in the $M_{PDCCH}^{set}$ may be from a second search space, which may be associated with a second CORESET. The first CORESET and the second CORESET may have a different CORESET-id.

In examples, search spaces associated with one or more PDCCHs in a $M_{PDCCH}^{set}$ may be associated with a CORESET and/or a same CORESET-id. A search space (e.g., each search space) may be configured with one or more QCL parameters. The QCL parameter(s) configured in the associated CORESET may be ignored or overridden by the QCL parameter(s) configured in a search space (e.g., each search space), for example, if a WTRU monitors one or more PDCCHs in a search space.

In examples, a PDCCH candidate may be received from one or more spatial Rx parameters (e.g., QCL type-Ds). A PDCCH candidate with first spatial Rx parameters may be referred to as a first PDCCH in a $M_{PDCCH}^{set}$. A PDCCH candidate with second spatial Rx parameters may be referred to as a second PDCCH in a $M_{PDCCH}^{set}$.

PDCCHs may be overlapped (e.g., partially overlapped) in the time and/or frequency domains (e.g., time division multiplexing (TDM) and/or frequency division multiplexing (FDM)). One or more search spaces associated with one or more PDCCHs in a $M_{PDCCH}^{set}$ may be overlapped in time and/or frequency.

In examples, one or more search spaces for PDCCHs in a $M_{PDCCH}^{set}$ may be associated with the same CORESET (e.g., same CORESET-id). The one or more search spaces may be monitored in a different time location (e.g., different symbols in a slot or a different slot). A search space (e.g., each search space) may be configured with one or more QCL parameter(s). The QCL parameter(s) configured in an associated CORESET may be ignored or overridden by the QCL parameter(s) configured in a search space (e.g., each search space), for example, if a WTRU monitors one or more PDCCHs in a search space.

In examples, one or more search spaces for PDCCHs in a $M_{PDCCH}^{set}$ may be associated with different CORESETs. Search spaces may be located within a time window (e.g., a slot, a subframe, etc.).

PDCCHs may be non-overlapped in time and frequency domains (e.g., TDM and/or FDM). One or more search spaces associated with one or more PDCCHs in a $M_{PDCCH}^{set}$ may be associated with different CORESETs and may be located in a non-overlapped time location (e.g., symbol and/or slot).

A WTRU may determine associated CORESETs. A WTRU may support reliability enhancements of PDCCH reception, for example, based on using one or more CORESETs. In examples, a WTRU may jointly decode a DCI, for example, by combining signals of multiple PDCCHs received from multiple CORESETs. Multiple CORESETs for receiving multiple PDCCHs to decode a DCI may be associated with each other, for example, by using one or more of following: an explicit indication or an implicit indication.

In examples of associating CORESETs by an explicit indication, a WTRU may receive one or more CORESET IDs, for example, using a downlink channel (e.g., a PDCCH and/or a PDSCH). A downlink channel may carry bit information for one or more CORESET IDs.

In examples, a WTRU may receive one or more associated CORESET IDs in a CORESET configuration (e.g., each CORESET configuration), which for example may be in and/or received in one or more radio resource control (RRC) messages.

In examples, a WTRU may receive one or more associated CORESET IDs in one or more MAC-CE messages. The one or more MAC-CE messages may comprise, for example, one or more of following: a target Cell ID; a target BWP ID; target CORESET IDs; and/or associated CORESET IDs.

In examples, a gNB may indicate one or more associated CORESET IDs in one or more group DCIs. One or more DCI fields in the one or more group DCIs may comprise (e.g., explicitly comprise) one or more CORESET IDs. An indication of one or more CORESET IDs may be based on an RRC configuration. For example, a WTRU may be provided a list. A codepoint (e.g., each codepoint) of the list may comprise one or more of CORESET groups. One or more of the CORESET groups (e.g., each of the one or more CORESET groups) may comprise one or more associated CORESET IDs. A WTRU may receive a DCI field indicating a codepoint of the list. A WTRU may receive multiple PDCCHs and decode a DCI, e.g., based on the codepoint. In examples, a group DCI may indicate the CORESET IDs and the CORESET IDs may indicate to the WTRU which CORESET IDs are associated with receiving the WTRU specific DCI.

A WTRU may receive one or more CORESET group IDs, for example, using a downlink channel transmission (e.g., a PDCCH and/or a PDSCH). A downlink channel transmission may carry bit information for one or more CORESET group IDs. For example, a WTRU may receive one or more group IDs in a CORESET configuration (e.g., each CORESET configuration), e.g., where the CORESET configuration(s) are received via one or messages, such as one or more RRC messages. One or more CORESETs may be determined to be associated CORESET(s) based on the one or more CORESETs comprising one or more identical CORESET group IDs.

In examples, an indication that CORESETs are associated may be provided by an implicit indication, which may be based on a CORESET pool ID and/or a CORESET decoding type.

In examples, a WTRU may receive multiple PDCCHs for a DCI based on CORESETs with an identical CORESET pool ID.

In examples, a WTRU may receive a decoding type, e.g., in a CORESET configuration (e.g., each CORESET configuration) of one or more RRC messages. A WTRU may jointly decode PDCCHs from one or more CORESETs that may be indicated as multi-PDCCH decoding, e.g., if a decoding type is indicated as multi-PDCCH decoding. A WTRU may decode a PDCCH from the CORESET, e.g., if a decoding type is not indicated or indicates single PDCCH decoding.

Associated CORESET(s) may be used interchangeably with CORESETs in a CORESET group, and/or CORESETs with an identical PDCCH decoding type.

A WTRU may determine multi-PDCCH decoding.

A WTRU may apply multi-PDCCH decoding, for example, based on one or more of the following: an RNTI, CORESET ID, precoder granularity, or a control channel element (CCE) resource element group (REG) mapping type.

A WTRU may apply multi-PDCCH decoding, for example, based on RNTI. For example, a WTRU may apply multi-PDCCH decoding for one or more PDCCHs that may be CRC scrambled by a first RNTI (e.g., a cell (C)-RNTI, an MCS-C-RNTI, and/or a configured scheduling (CS)-RNTI) with multi-PDCCH decoding. The WTRU may apply single-PDCCH decoding for one or more PDCCHs that may be CRC scrambled by a second RNTI (e.g., a system information (SI)-RNTI, a paging (P)-RNTI, a random access (RA)-RNTI, a slot format indication (SFI)-RNTI, an interruption (INT)-RNTI, a transmit power control (TPC)-PUSCH-RNTI, a TPC-PUCCH-RNTI, and/or a TPC-SRS-RNTI).

A WTRU may apply multi-PDCCH decoding, for example, based on CORESET ID. For example, a WTRU may apply single-PDCCH decoding for one or more CORESETs with a first CORESET ID (e.g., CORESET 0), and may apply multi-PDCCH decoding for one or more CORESETs with a second CORESET ID (e.g., CORESETs other than 0).

A WTRU may apply multi-PDCCH decoding, for example, based on precoder granularity (e.g., REG bundle size).

A WTRU may apply multi-PDCCH decoding, for example, based on a CCE REG mapping type (e.g., interleaved or non-interleaved).

A WTRU may determine whether the WTRU is to perform decoding (e.g., is to attempt to perform decoding) using single-PDCCH decoding or multi-PDCCH decoding, for example, based on a downlink measurement quality. Single-PDCCH decoding may be a separate configuration from multi-PDCCH decoding or a part of multi-PDCCH decoding. The WTRU may attempt to decode/decode using the determined single-PDCCH decoding or multi-PDCCH decoding.

Single-PDCCH decoding may refer to a WTRU monitoring one out of multiple PDCCHs for multi-PDCCH decoding. For example, a WTRU may be configured with multi-PDCCH decoding. Multiple (e.g., two) PDCCHs may be used for a DCI reception. The WTRU may decode or attempt to decode a first PDCCH (e.g. only a first PDCCH) or a second PDCCH (e.g., only a second PDCCH) for a DCI reception, which may be referred to as a single-PDCCH decoding. A WTRU may be configured with a separate configuration (e.g., of single-PDCCH decoding), which may be different from multi-PDCCH decoding (e.g., in terms of a number of CORESETs, CORESETPoolId, etc.).

A WTRU may determine whether to perform, decode, or operate single-PDCCH decoding or multi-PDCCH decoding, for example, based on one or more of the following: a DL measurement of one or more reference signals associated with PDCCHs; a system parameter; a number of PDCCH blind decoding and/or non-overlapped CCEs for channel estimation in a slot; a traffic type expected in a slot; a PDSCH/PUSCH scheduling type; a demodulation reference signal (DM-RS) configuration; or minimum scheduling timing.

A WTRU may determine whether to perform, decode, or operate single-PDCCH decoding or multi-PDCCH decoding, for example, based on a DL measurement of one or more reference signals that may be associated with PDCCHs (e.g., a measurement reference for CORESETs associated with multiple PDCCHs (e.g., a PDCCH group)).

In examples, a WTRU may decode a PDCCH associated with a CORESET with a measurement that is higher than a threshold, e.g., if a measurement of a CORESET within a CORESET group is higher than a threshold. A measurement may include, for example, at least one of a reference signal received power (RSRP), an L1-RSRP, a signal-to-interference-plus-noise ratio (SINR), an L1-SINR, or a radio link quality (e.g., a hypothetical block error rate (BLER)).

In examples, a WTRU may decode or attempt to decode the PDCCH of a CORESET with higher measurement results, for example, if measurement results of CORESETs have a gap larger than X [dB].

In examples, a WTRU may perform single-PDCCH decoding, for example, if a sum of measurement results from CORESETs associated with multi-PDCCH decoding is within a certain gap Y [dB] from the measurement result of the CORESET with the highest measurement result.

A WTRU may determine whether to perform, decode, or operate single-PDCCH decoding or multi-PDCCH decoding, for example, based on a system parameter (e.g., a slot number, a subframe number, a radio frame number).

A WTRU may determine whether to perform, decode, or operate single-PDCCH decoding or multi-PDCCH decoding, for example, based on a number of PDCCH blind decoding and/or non-overlapped CCEs for channel estimation in a slot. In examples, a WTRU may perform single-PDCCH decoding, for example, if the number of PDCCH blind decoding and/or if the number of non-overlapped CCEs for channel estimation is higher than a threshold. The WTRU may perform multi-PDCCH decoding, for example, otherwise.

A WTRU may determine whether to perform, decode, or operate single-PDCCH decoding or multi-PDCCH decoding, for example, based on a traffic type (e.g., eMBB or URLLC) that may be expected in a slot.

A WTRU may determine whether to perform, decode, or operate single-PDCCH decoding or multi-PDCCH decoding, for example, based on a PDSCH/PUSCH scheduling type (e.g., slot-level or sub-slot level).

A WTRU may determine whether to perform, decode, or operate single-PDCCH decoding or multi-PDCCH decoding, for example, based on a DM-RS configuration (e.g., a front-loaded DM-RS or a front-loaded DM-RS with an additional DM-RS).

A WTRU may determine whether to perform, decode, or operate single-PDCCH decoding or multi-PDCCH decoding, for example, based on a minimum scheduling timing (e.g., a minimum K0 value in a time domain resource allocation (TDRA) table).

A WTRU may determine whether to avoid buffering.

A WTRU may skip blind decoding of PDCCHs from a CORESET, for example, based on one or more conditions.

A WTRU may skip blind decoding of PDCCHs from a CORESET, for example, if a DCI is successfully decoded, for example, based on PDCCHs from earlier CORESETs associated with the CORESET. In examples, a WTRU may not decode a DCI from a second CORESET, for example, if a DCI is successfully decoded from a first CORESET. A successfully decoded DCI may comprise passing a CRC check.

A WTRU may skip blind decoding of PDCCHs from a CORESET, for example, if one or more CORESETs associated with the CORESET are deactivated.

A WTRU may skip blind decoding of PDCCHs from a CORESET, for example, if a CORESET group associated with the CORESET is deactivated.

Skipping blind decoding may be accomplished, e.g., based on one or more of the following conditions: CORESETs are within a time window and/or CORESETs are within a frequency window.

In examples, a WTRU may skip decoding of a DCI from a second CORESET within a time window, for example, if a DCI is decoded (e.g., successfully decoded) from a first CORESET. A time window may be configured in or may be based on, for example, one or more of milliseconds, symbols, slots, or frames. A time window may be based on a particular CORESET (e.g., the first CORESET). For example, a time window may be defined as n+T, wherein n may indicate the slot of the first CORESET. A time window may be based on periodicity and offset. For example, a WTRU may be configured with periodicity and offset in one or more RRC configurations. A WTRU may determine CORESETs in a time window, for example, based on the periodicity (e.g., configured periodicity) and the offset (e.g., configured offset).

In examples, a WTRU may skip decoding a DCI from a second CORESET within a frequency window, for example, if a DCI is decoded (e.g., successfully decoded) from a first CORESET. A frequency window may be based on one or more of a resource block (RB), a resource block group (RBG), a precoding resource block group (PRG), and/or a subband.

A WTRU may determine a prioritization of CORESETs. Prioritization may be implemented, for example, among CORESETs and/or CORESET groups. For example, a WTRU may determine a first one or more CORESETs to be decoded or monitored. A WTRU may monitor the first one or more CORESETs, e.g., based on the determination. The WTRU may skip monitoring a second one or more CORESETs. A WTRU may determine a first one or more CORESETs, for example, based on one or more of following: a lowest CORESET ID; a lowest CORESET group ID; a lowest physical cell ID; and/or a lowest serving cell ID.

A WTRU may prioritize CORESETs, for example, based on a lowest CORESET ID. In examples, a WTRU may determine or select CORESETs with the lowest CORESET ID. A WTRU may (e.g., for one or more of associated CORESETs) determine (e.g., select) a CORESET ID among one or more CORESET IDs of the associated CORESETs for a prioritization. For example, a WTRU may determine or select CORESET(s) with the lowest CORESET ID(s) among one or more of CORESET IDs.

A WTRU may prioritize CORESETs, for example, based on a lowest CORESET group ID. For example, a WTRU may determine or select CORESET group(s) with the lowest CORESET group ID(s).

A WTRU may prioritize CORESETs, for example, based on a lowest physical cell ID. For example, a WTRU may determine or select CORESET(s) associated with the lowest physical cell ID(s).

A WTRU may prioritize CORESETs, for example, based on a lowest serving cell ID. For example, a WTRU may determine or select CORESET(s) associated with the lowest serving cell ID(s).

Prioritization may be used, for example, if one or more of the following conditions are satisfied: a number of CORESETs per slot is larger than a maximum number of CORESETs that the WTRU supports; a number of serving cells is larger than a number (e.g., first number); and/or a number of active BWPs in serving cells is larger than a number (e.g., first number).

A WTRU may determine time references for repetitions. Different timing references may be determined for DCI repetitions. A DCI repetition (e.g., each DCI repetition) may be sent with a timing offset, and the timing offset may be variable. A WTRU may determine the time instant if the DCI may be sent according to a reference timing point and an offset with respect to the reference timing point. A WTRU may use one of a random access channel (RACH) occasion; a synchronization signal block (SSB); a search space slot; or a pattern of slot indices as a reference timing point.

Figure 4:
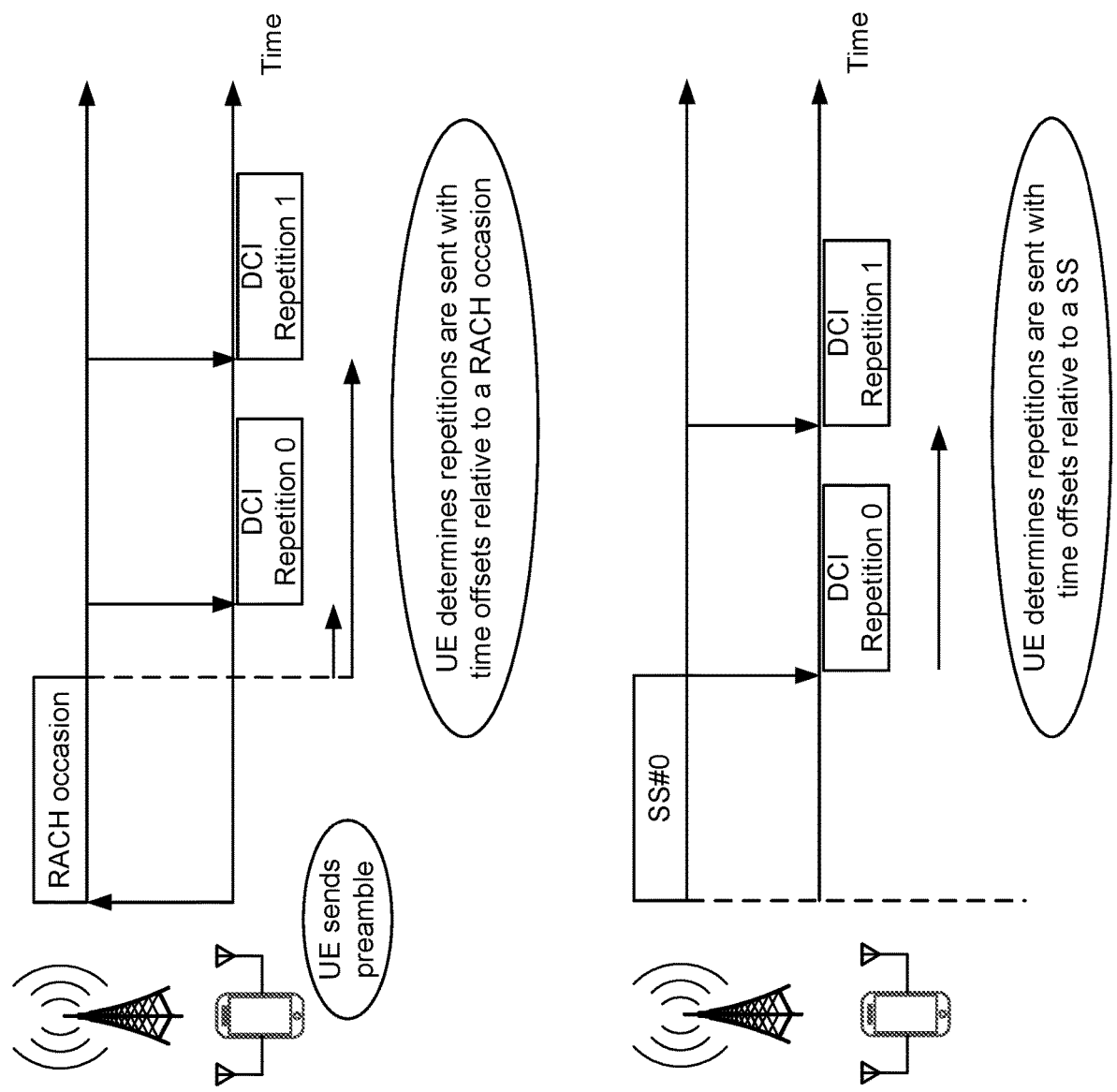
FIG. 4 is a diagram illustrating example DCI repetition offsets.

A WTRU may use a RACH occasion as a reference timing point. A WTRU may determine that multiple repetitions of a DCI may be sent in search spaces within a time gap after a RACH occasion slot. The WTRU may determine where the repetitions may be offset with respect to the RACH occasion slot. As illustrated in FIG. 4, a WTRU may identify that a RACH occasion may be followed by repetition 0 and repetition 1. If a WTRU uses a preamble from the RACH occasion to send msg1, the WTRU may determine that msg2 may be sent with two repetitions offset from the RACH occasion.

A WTRU may use an SSB as a reference timing point. A WTRU may use the location of an SSB and determine the repetition offsets from the SSB timing. A WTRU may measure the RSRP or reference signal received quality (RSRQ) and may determine the presence and number of repetitions based at least on a channel measurement. The WTRU may determine channel measurement by determining that more than one repetitions may be sent if the RSRP or RSRQ falls below a threshold n1. The WTRU may determine channel measurements by determining the number of repetitions based on a mapping from RSRP or RSRQ value to number of repetitions. For example, if the WTRU determines RSRP may be less than n1 (RSRP<n1), the WTRU may determine to use K=2 repetitions. If the WTRU determines RSRP may be greater than n1 (RSRP>n1), the WTRU may determine to use K=1 repetitions.

A WTRU may use a search space slot as a reference timing point. A WTRU may determine the search space (SS) ID and may determine that repetitions are sent with respect to the SS slot with an offset as a function of the repetition number. As illustrated in FIG. 4, a WTRU may use SS0 at T1. The WTRU may determine that repetition k may be sent at time T1+k*T_offset where T_offset may be a configurable parameter. The search space may be configured with a value for the k-th repetition. A WTRU may first monitor (e.g., be restricted to first monitor) the SS with k equal to zero (k=0), and if it fails to receive with k equal to zero (k=0), the WTRU may search the search spaces (SSs) configured with k greater than zero (k>0).

A WTRU may use a pattern of slot indices as a reference timing point where a slot index (e.g., each slot index) may be used to determine the repetitions number. A WTRU may use the slot format indicator (SFI) to determine the DL slot timing. The WTRU may use a pattern which identifies slot 1 where repetition 1 may be sent, and slot 2 where repetition 2 may be sent. The pattern of slots with repetitions may be configured with the SFI or configured in a separate system information block (SIB).

A WTRU may determine a TCI for data if multiple DCI repetitions are detected. If a single DCI is sent, a WTRU may determine the spatial filter to use for the scheduled data (e.g., a PDSCH transmission or a PUSCH transmission) based on the DCI. The DCI may contain an explicit QCL indication and the WTRU may have time (e.g., enough time) to switch spatial filters. If the WTRU does not have time to switch its spatial filter, the WTRU may use (e.g., use as a default) the same spatial filter that was used to receive the DCI. If multiple DCI repetitions are used and each DCI repetition may be sent with its own TCI, the WTRU may not have information to determine which TCI to use for the scheduled data. A WTRU may receive an indication K equals 2 (K=2). The WTRU may identify that repetition 1 may be configured with TCI1, and repetition 2 may be configured with TCI2. It may be unclear whether a WTRU expects the scheduled data to be sent with TCI1 or TCI2. WTRU behavior may not be defined if a CORESET may be configured with multiple TCI values or if a data transmission may be scheduled using DCI with multiple TCI values.

A WTRU may determine the spatial relation for scheduled data based on a rule that determines a spatial relation (e.g., a default spatial relation) that may be applied if multiple DCI repetitions are received with multiple TCIs scheduling the data. The reference timing used by the WTRU to switch its spatial filter may depend on if the rule may be applied. The WTRU may switch its spatial filter if the WTRU identifies the repetition that satisfies the rule. The WTRU may ignore other repetitions. The WTRU may determine how many repetitions are expected and may switch its spatial filter after receiving the repetitions.

If a WTRU receives multiple DCIs with different TCIs, the WTRU may apply one or more rules or logic (e.g., associated with a TCI, to determine a DCI, etc.) such as, for example, one or more of the following.

A WTRU may use the TCI corresponding to a repetition index k. The WTRU may determine the index of the DCI repetition and may use the TCI of the k-th DCI repetition.

A WTRU may use the TCI from the last successfully received DCI. The DCI may correspond to a DCI sent without repetition that may have been used in a previous transmission, or, the DCI may correspond to one of the repetitions in the current set of repetitions.

A WTRU may determine to use the TCI associated with the first DCI repetition correctly decoded within the set of K repetitions.

A WTRU may use the repetition with the TCI corresponding to the RS with the highest RSRP.

A WTRU may determine that the TCI associated with one panel may be used. A WTRU may receive repetition 1 on panel 1 and repetition 2 on panel 2. The WTRU may use the TCI associated with panel 1 (e.g., because panel 1 may be the one panel that the WTRU is configured to use).

A WTRU may determine that the TCI associated with a TRP index may be used. If a WTRU receives repetition 1 from TRP1 and repetition 2 from TRP2, the WTRU may use the TCI from TRP1 (e.g., because TRP1 may be the TRP associated with the TRP index).

A WTRU may determine to use TCIs from known states, e.g., if some of the repetitions are configured with an unknown TCI state. An unknown TCI state may be a TCI state for which a WTRU may not have determined the spatial filter (e.g. the WTRU has not performed the measurements on the QCL'd source RS).

A WTRU may determine to use a TCI index as a reference. The WTRU may use the lowest TCI index from the repetitions (e.g., all the repetitions), or a specific TCI index (e.g., TCI=2).

A WTRU may determine the TCI using a codepoint table configured for the PDSCH and may determine a codepoint index. A WTRU may receive multiple DCI repetitions. The WTRU may determine to use the TCI corresponding to TCI codepoint 1 which may be configured for the PDSCH.

A WTRU may use a pattern of TCI. The WTRU may determine the TCI based on a mapping from the pattern. In an example, the pattern may include TCI1 and TCI2. The WTRU may determine which TCI from the pattern to use depending on the number of repetitions. If one (1) repetition is determined, the WTRU may determine to use TCI1. If two (2) repetitions are determined, the WTRU may determine to use TCI2.

A WTRU may determine the TCI based on the RNTI of the DCI. If the WTRU decodes a DCI scrambled with a C-RNTI, the WTRU may use TCI1. If the WTRU decodes a DCI scrambled with a RA-RNTI, the WTRU may use TCI2.

A WTRU may select the TCI based on the traffic type. If the WTRU receives a DCI scheduling URLLC data, the WTRU may use TCI1 as a reference. If the WTRU receives a DCI scheduling eMBB data, the WTRU may use TCI2.

A WTRU may determine PDCCH candidates from multiple TRPs and/or beams. A WTRU may determine at least one PDCCH candidate mapped over resources that may have more than one QCL association or TCI state (e.g., resources transmitted from more than one TRP or beam). A WTRU may determine PDCCH candidate(s) (e.g., a set of PDCCH candidates), for example for a mode of operation (e.g., where the mode of operation may refer to a PDCCH transmission where a PDCCH candidate is sent with two TCI states, for example one PDDCH candidate may be transmitted over several RBs, where some of the RBS may be sent with TCI1 and other RBs may be sent with TCI2).

A WTRU may determine PDCCH candidates by determining a search space configuration including more than one CORESET identity. The WTRU may determine control channel elements and/or resource element groups, e.g., by combining the resources of the more than one CORESET according to one or more rules (e.g., pre-defined rules). The WTRU may determine REGs and/or CCEs from a juxtaposition in the time domain of the more than one CORESET. The WTRU may determine PDCCH candidate(s) (e.g., blind level PDCCH candidate(s)) based on concatenating control channel elements that may have the same index from a corresponding CORESET, which may increase (e.g., double) the aggregation level. The WTRU may interleave bits or symbols of the combined control channel elements, or interleave the control channel elements themselves. Doing so may improve robustness in case of unequal quality between the TRPs.

A WTRU may determine PDCCH candidates by determining a single CORESET with more than one symbol in the time domain, e.g., if the QCL association or TCI state depends on the time symbol. The WTRU may perform other (e.g., all other) operations (e.g., REG/CCE mapping, determining PDCCH candidates) from existing rules. The WTRU may determine that an REG or CCE includes resource elements from both symbols according to a mapping rule (e.g., a new mapping rule).

A WTRU may determine PDCCH candidates by determining a search space for such candidates, e.g., based on a combination of at least two previously configured search spaces. A combination of at least two search spaces may be signaled by higher layers. PDCCH candidates for the combination may be restricted to monitoring slots/symbols common to the at least two search spaces. A separate periodicity and offset may be specifically configured for the combination. The PDCCH candidates may be derived as the combination (e.g., juxtaposition) of control channel elements from both search spaces. The WTRU may interleave bits or symbols of the combined control channel elements, or interleave the control channel elements themselves.

If the number of PDCCH candidates, or the number of control channel elements, exceed respective maximums in a slot or PDCCH span (e.g., overbooking), the WTRU may apply a lower or higher priority level to the PDCCH candidates mapped to resources with more than one QCL properties compared to other resources. The WTRU may determine the priority level and/or whether to activate or deactivate PDCCH monitoring from such resources based on a MAC CE received from the network.

A WTRU may determine (e.g., detect) PDCCH decoding failure and/or behavior. As TRPs send their own PDCCH transmission, which may be mapped to different CORESETs or different search spaces in the same CORESET or two different search spaces associated with two different CORESETs, the WTRU may have the right signals (RS) and may use the RS to discriminate between radio link quality.

The WTRU may be configured with TCI states. The TCI states may result in CSI-RSs and PDCCH DM-RS for a specific TRP radio link being collocated (e.g., QCL). Two disjoint sets of CSI-RS #1 and DM-RS #1 and CSI-RS #2 and DM-RS #2 sets may be used for a WTRU configured with MTRP reception. These TCI states may be configured per CORESET and per TRP. If multiple CORESETs are defined per TRP, the spatial relation for CSI-RS and DM-RS colocation may be maintained per TRP. Other subdivisions (e.g., any other subdivision) of the search spaces and CORESETs may follow the TCI states division per TRP.

As a WTRU monitors (e.g., initiates monitoring) PDCCH for links (e.g., both links), the WTRU may measure (e.g., simultaneously measure) CSI-RS for TRP configured radio links (e.g., each TRP radio link). The WTRU may maintain, for each link, the one or more of the following measurements and numbers (e.g., counters) respectively: a Qin, aQout (e.g., for radio link monitoring (RLM)) and RLM numbers (e.g., counters and timers); a RSRP; a RSRQ; L1-SINR; and a channel quality indicator (CQI).

A CORESET or a search space (SS) may have two associated TCI states (e.g., different TCI states). The WTRU may use two different spatial filters and may decode the PDCCH candidates accordingly. The WTRU may apply a different spatial filter to each decoding candidate per TRP/TCI.

The WTRU may determine to decode (e.g., attempt to decode) PDCCH candidates (e.g., both PDCCH candidates) or one candidate (e.g., only one candidate) based on one or more measurements based on RLM results or associated CSI-RS per TRP. Qin/Qout may be replaced with RSRP thresholds or a L1-SINR level linked to a CSI-RS set belonging to a TRP. If a previously computed (e.g., a last computed) Qin/Qout state of a TRP link is Qin, the WTRU may attempt to decode the associated PDCCH transmission. If the links (e.g., both links) indicate a previously evaluated (e.g., a last evaluated) RLM state is Qin, and a first TRP related PDCCH transmission failed, the WTRU may search for and decode the second TRP associated PDCCH transmission. If a previously computed (e.g., a last computed) Qin/Qout RLM state for TRPs (e.g., both TRPs) indicate Qout, and the WTRU did not declare radio link failure (RLF), the WTRU may initiate decoding spatially related PDCCH transmissions (e.g., both spatially related PDCCH transmissions) in the CORESET. If the WTRU successfully decoded a first PDCCH candidate from one TRP, the WTRU may abandon the search and decoding for the second PDCCH candidate.

MTRP related PDCCH decoding feedback may be provided. The following feedback and measurement reporting techniques may be used alone or in any combination.

If a PDCCH candidate from a specific TRP fails decoding (e.g., all decoding options), and the other PDCCH transmission from the other TRP is successfully decoded, the WTRU may include in a feedback message the PDCCH decoding failure indication for that TRP.

The WTRU may include a feedback for the PDCCH decoding status which may help a gNB adapt the aggregation level or switch the repetition scheme for the PDCCH reliability, including reconfiguring the WTRU with single TRP transmission or other measure (e.g., BWP reconfiguration).

The feedback may be added to the Ack/Nack on a PUCCH transmission for the scheduled PDSCH transmission or in a UCI for a subsequent PUSCH transmission in a form of a two bit codebook. A two bit codebook may be as follows: {(0,1), (1,0), (1,1)}.

The WTRU may use two different RNTIs, e.g., one per PDCCH or TRP. The WTRU may use the successful PDCCH related RNTI for feedback so that the gNB may determine which PDCCH transmission was successful. A WTRU may use (e.g., implicitly or explicitly) the RNTI of the decoded PDCCH transmission to indicate whether decoding of the first or second received PDCCH transmission was successful.

A WTRU may indicate an ID corresponding to a CORESET or SS associated with a PDCCH (e.g., the CORSETpoolindex) to indicate the decoded PDCCH transmission.

If a WTRU receives multiple PDCCH transmissions, the WTRU may attempt to decode the first transmission. If decoding of the first transmission fails, the WTRU may attempt to decode the second transmission, and so forth. If attempting to decode individual PDCCH transmissions fail, a WTRU may attempt to decode the soft combining of the received PDCCH transmissions.

For two PDDCH repetitions, a WTRU may use an ID corresponding to each attempt and may feedback the ID to the gNB. The ID may be associated with each attempt and may be a simple index (e.g., 1, 2, 3, etc.). The ID may be an RNTI (e.g., RNTI_attempt1, RNTI_attempt2, etc.). The ID may correspond to a CORESET or SS associated with a PDCCH (e.g., the CORSETpoolindex).

A WTRU may use (e.g., only use) two IDs in connection with two PDCCH repetition. A WTRU may indicate ID1 if a first attempt is successful, and ID2 if the second attempt is successful. The WTRU may indicate no ID in its feedback to indicate that its final attempt by soft combining is successful.

For two PDDCH repetitions, to reduce the number of decoding attempts and power consumption, a WTRU may twice (e.g., only twice) attempt decoding of the received PDCCH transmission. The two attempts may be decoding of PDCCH1 and PDCCH2, or decoding of PDCCH1 and the soft-combining of PDCCH1 and PDCCH2. A WTRU may indicate its capability for PDCCH decoding (e.g., a number of decoding attempts and soft-combining capability to the gNB. Based on the indicated capability, a WTRU may receive relevant configuration parameters (e.g., power saving mode, processing time parameters, etc.). A WTRU may feedback (e.g., implicitly or explicitly feedback) the RNTI of the decoded PDCCH transmission to indicate whether decoding of the first or second attempt was successful.

The determination of a successful PDCCH transmission decoding may be made at the PUCCH resource selection. A specific PUCCH resource (e.g., a resource for a set of configured PUCCH resources) may be linked to a successful TRP PDCCH transmission decoding.

If a gNB determines to send the DCI in more than one aggregation level (AL), the WTRU may report which AL has been successfully decoded. The WTRU may report the minimum successful AL (e.g., search space index, CORESET ID, REG bundle size). The report may be mapped to a codebook which may minimize the size of the feedback report. The report may be periodic or triggered by a threshold (e.g., a threshold related to the AL size) or related to failed attempts if the PDCCH transmission is sent in all ALs.

A WTRU may use an ID corresponding to each AL to indicate the minimum successful AL. The ID may be associated with each attempt and may be a simple index (e.g., 1, 2, 3, etc.) corresponding to AL=1, 2, 4, etc. The ID may be a RNTI (e.g., RNTI_AL1, RNTI_AL2, etc.). The ID may correspond to a CORESET or SS associated with a PDCCH (e.g., the CORSETpoolindex).

The WTRU, based on the PDCCH decoding success or failure per TRP, may maintain a number (e.g., via a counter) per TRP that may increase for each consecutive failure and may reset if a successful PDCCH transmission decoding is performed. Each number may have a network configured threshold. If the WTRU reaches the threshold for a specific TRP, the WTRU may signal the decoding failure using a feedback technique. The threshold may be set, for example, to one (1), which may result in each failure being reported. A higher number may imply failure feedback after the number increase rules and threshold are met.

The WTRU, upon signaling a PDCCH transmission decoding failure for a specific TRP, may stop decoding attempts associated with the TRP and may operate in single TRP reception mode. If a TRP has determined the Qin/Qout state as Qin, and a failed PDCCH decoding threshold is reached, the WTRU may signal the threshold. The WTRU may continue to monitor and attempt to decode the PDCCH on the TRP.

If the measurements for a TRP based on QCLed RS signals (e.g., CSI-RS) associated with the TRP fall below a threshold, the WTRU may report using a RRC report (e.g., L3) or using a physical layer feedback implementation, and may stop attempting to decode the related TRP PDCCH transmission. If the TRP is not in a RLF state, based on Qin/Qout state and numbers (e.g., counters), and the RS measurements are below a configured threshold, the WTRU may report the situation and continue the decoding attempts on the TRP related PDCCH transmission.

If the PDCCH transmission is sent in a time pattern repetitions mode, the WTRU may report the number of failed attempts in a repetition cycle. If the PDCCH is sent in two different slots and the WTRU fails the first attempt, the WTRU may signal the number of failures assuming PDCCH combining for one (1) attempt, otherwise zero (0) failures. The gNB may optimize the number of repetitions in the time domain or change the reliability scheme.

The WTRU may reset number(s) (e.g., counters) used in reporting implementations upon sending related feedback or a report.

PUCCH enhancements disclosed herein may be implemented in systems, devices and/or methods.

A WTRU may increase the reliability of a PUCCH transmission, for example, by transmitting multiple copies (e.g., two copies). A copy (e.g., each copy) may be transmitted, for example, with a different spatial relation, time, or frequency resource allocation (e.g., to improve receive diversity). A WTRU may be unable to transmit repetitions with different parameters towards multiple TRPs, for example, if PUCCH configurations are configured for only one spatial relation. Enhancements are disclosed to enable a WTRU to switch between different transmission configurations (e.g., transmission configurations with different spatial relations) and enable repetitions to be combined.

PUCCH formats 0 and 1 (e.g., in NR) may carry uplink control information (UCI) (e.g., small UCI), e.g., containing hybrid automatic repeat request (HARQ) feedback and/or scheduling request (SR) bits. PUCCH formats 1 and 0 may be based on, for example, a transmission of a sequence for carrying UCI information bits. A transmission of PUCCH format 0 may be completed, for example, over a duration of one or two symbols. PUCCH format 1 may be based on a transmission of a long sequence spreading over several symbols, for example, to offer a more reliable operation and performance for cell-edge WTRUs. A maximum RB size of PUCCH format 1 may be limited to one RB, which may not offer sufficient gain in range and reliability. Repetition of PUCCH format 1 over several slots may enhance reliability and coverage, but may increase decoding latency (e.g., at the same time). PUCCH format 2 may have a short duration (e.g., similar to PUCCH format 0). PUCCH format 2 may carry larger payloads (e.g., PUCCH format 2 may be configured with more than one RB).

Enhanced PUCCH transmission may be used for enhanced reliability and extended range, for example, in a system with one or more transmission points. One form of enhanced PUCCH transmission may be based on repetition (e.g., a form of repetition). In examples, transmission of short PUCCH (e.g., PUSCH formats 0 and 2) may be repeated within a slot, for example, to enhance coverage and transmission reliability. PUCCH repetition may be realized, for example, by using resources that may otherwise be used for PUSCH transmission (e.g., as shown by example in FIG. 5).

Figure 5:
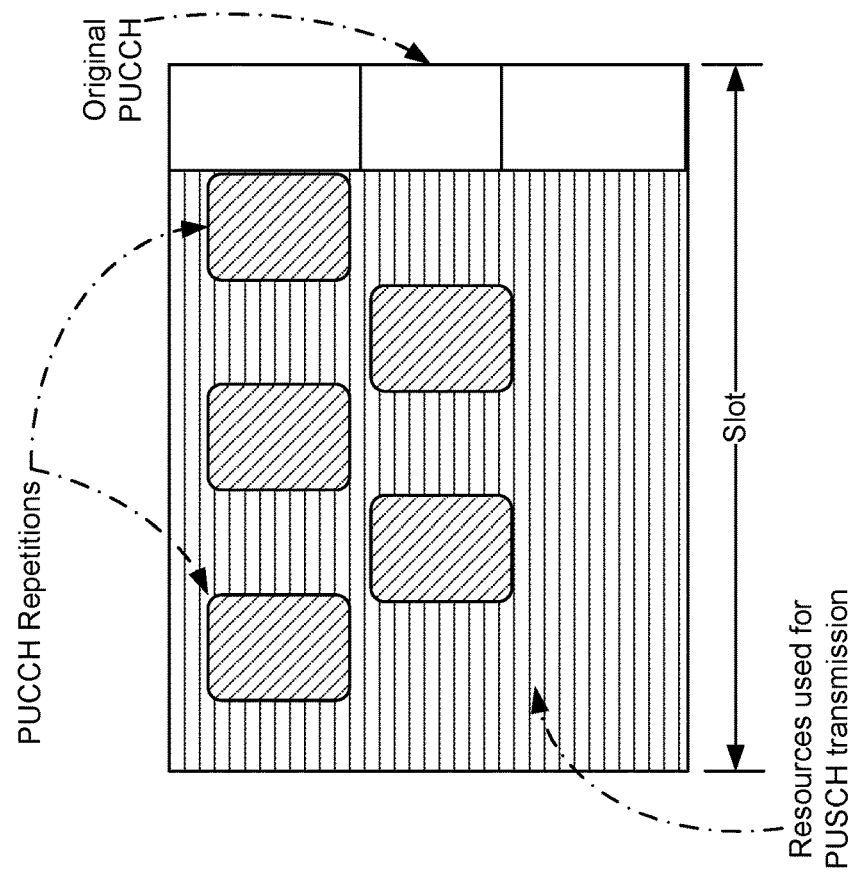
FIG. 5 is a diagram illustrating an example of PUCCH repetition for an enhanced PUCCH.

FIG. 5 is a diagram illustrating an example of PUCCH repetition for an enhanced PUCCH transmission.

Activation and deactivation of enhanced PUCCH transmissions and resource allocation may be made, for example, by a WTRU. A WTRU may determine (e.g., implicitly and/or explicitly determine) use of enhanced PUCCH transmission, for example, by dynamic or semi-static signaling. A WTRU may receive a set of resources (e.g. an indication of a set of resources) for enhanced PUCCH transmissions. An indication of resources may be received (e.g., implicitly or explicitly received), for example, through a semi-static or dynamic indication.

A WTRU may, for example, implicitly determine use of an enhanced PUCCH transmission. A WTRU may determine (e.g., implicitly determine) activation (e.g., and deactivation) of enhanced PUCCH transmission. A WTRU may be configured to react to one or more implicit indications. A WTRU may consider an implicit indication in addition to other triggers to activate an enhanced PUCCH transmission. An implicit indication for an enhanced PUCCH transmission may be implemented. One or more of the following may apply.

In examples, a WTRU may detect activation of an enhanced PUCCH transmission, for example, if the WTRU determines that the WTRU is configured in MTRP transmission.

In examples, a WTRU may detect activation of an enhanced PUCCH transmission, for example, if the WTRU receives an indication by a DCI including multiple (e.g., two) TCI states and one code division multiplexing (CDM) group, and if the higher layer parameter RepSchemeEnabler is set to any of 'FDMSchemeA', 'FDMSchemeB' and 'TDMSchemeA'. Two antenna ports may be multiplexed on the same set of subcarriers by assigning different orthogonal codes. A WTRU may detect activation of an enhanced PUCCH transmission, for example, if the WTRU receives an indication by a DCI including two TCI states and two CDM groups, without a TDRA field.

In examples, a WTRU may be triggered to use multiple PUCCH configurations, for example, based on a detected RNTI. A WTRU may, for example, detect a DCI scrambled with an RNTI. The WTRU may determine from the RNTI values that a transmission is intended for multiple TRP (e.g., an MTRP-RNTI, or a C-RNTI with values defined in distinct ranges for single and MTRP). The WTRU may be triggered (e.g., based on the determination) to use a plurality of PUCCH configurations. In examples, a PUCCH configuration (e.g., each PUCCH configuration) may be associated with a separate K1, PUCCH resource indicator (PRI), and spatial relation, such that the WTRU may send multiple copies. An MTRP-RNTI may be defined, for example, to indicate or to permit the WTRU to determine the number of repetitions from the MTRP-RNTI value. For example, an MTRP-RNTI value may be defined from [0;k*n1−1] for n1 repetitions and from [k*n1:k*n2−1] for n2 repetitions, where k may be a scaling factor. The WTRU may determine to use n1 repetitions with n1 associated K1, PRI, spatial relations, and/or PUCCH configurations, for example, if an MTRP-RNTI value is smaller than k*n1. Multiple PUCCH configurations, K1, PRI, spatial relations, and the like may be indicated (e.g., explicitly indicated) in a DCI (e.g., scrambled with the mTRP-RNTI) and/or may be preconfigured at the WTRU.

A WTRU may perform an enhanced PUCCH transmission, for example, based on a quality measurement threshold. A WTRU may perform an enhanced PUCCH transmission, for example, based on a comparison of a downlink measurement (e.g., a L1-RSRP, a L1-SINR, a CQI, a state of mobility, a doppler frequency, etc.) to a configured threshold.

A WTRU may determine activation of an enhanced PUCCH transmission, for example, based on a PUCCH format and/or priority. For example, a WTRU may employ an enhanced PUCCH transmission for PUCCH format 0 or 1 (e.g., only PUCCH format 0 or 1).

A WTRU may be configured (e.g., explicitly configured) to activate or deactivate an enhanced PUCCH transmission.

A WTRU may be configured (e.g., by higher layer signaling) to activate or deactivate an enhanced PUCCH transmission. A WTRU may be configured with additional information related to a set of dedicated resources that may be used for enhanced transmission (e.g., PUCCH repetition on dedicated resources). Dedicated resources may be determined (e.g., based on a configuration) to be available statically (e.g., without a time limit or always) and/or for a configured duration of time. The duration of time (e.g., which may be traced, for example using a timer) may be based on, for example, an (e.g., explicit) indication (e.g., a DCI or a MAC CE).

A WTRU may receive an (e.g., a dynamic) indication (e.g., through a DCI or a MAC CE) to activate or deactivate an enhanced PUCCH transmission. In examples, a DCI field may be considered to be an indication of activation or deactivation of an enhanced PUCCH transmission. The DCI field may be a new field or a re-use of an existing field.

A DCI may indicate a set of resources for use by an enhanced PUCCH transmission. In examples, a DCI may (e.g., directly) point to a set of resources. Resources may be determined, for example, based on a fixed or configurable offset from the PUSCH resources. Resources indicated for enhanced PUCCH may be within or outside the PUSCH resource zones.

In examples, a WTRU may use indicated PUSCH resources for an enhanced PUCCH transmission, for example, if a WTRU receives a uplink grant (e.g., without sending an SR). A WTRU may interpret a received grant as an activation of an enhanced PUCCH transmission.

PUCCH repetition and resource selection may be provided. A WTRU may perform intra-slot hopping for a repetition (e.g., each repetition), for example, to improve (e.g., further improve) performance of a PUCCH repetition. A WTRU may use a different repetition and hopping pattern (e.g., per PUCCH type). A WTRU may assume a fixed or predefined repetition and hopping pattern. A WTRU may receive related information (e.g., semi-statically or dynamically). Related information may include hopping pattern(s). A WTRU may assume that the pattern may be fixed, predefined, or it may be dynamically/semi-statically indicated. In examples, a repetition may be repeated on locations other than a resource location indicated by a PUCCH resources indicator (e.g., as shown by example in FIG. 5, within a bandwidth part).

Beamforming for PUCCH transmission may be indicated (e.g., in NR) through spatial information. There may be one or more spatial relation configurations (e.g., parameter values) for a PUCCH resource (e.g., each PUCCH resource). A spatial setting for a PUCCH transmission may be provided (e.g., for a single configuration), for example, by pucch-SpatialRelationInfoId configured in PUCCH-SpatialRelationInfold. A WTRU may determine a spatial setting (e.g., single spatial setting) for a PUCCH transmission by a MAC control element, for example, if the WTRU is provided with multiple values for PUCCHSpatialRelationInfo. A PUCCH transmission may be performed according to a spatial filter used for receiving SSBs, configured CSI-RS's, or for transmission of an SRS, for example, depending on an index configured in spatial relation information.

Figure 6:
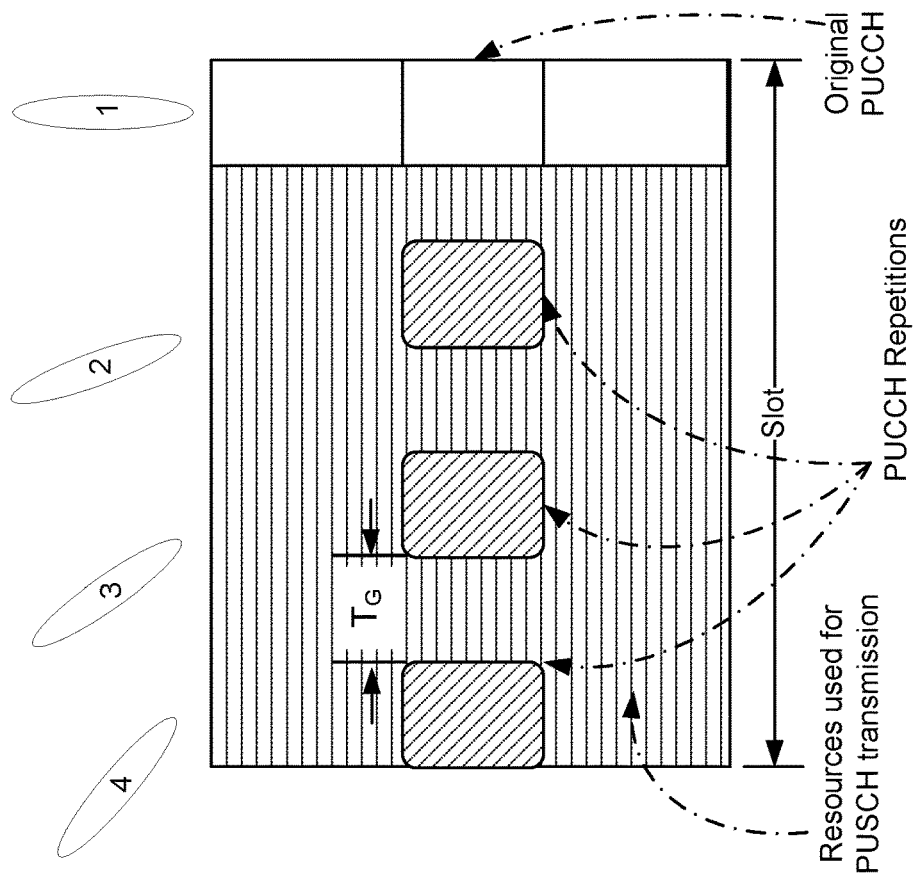
FIG. 6 is a diagram illustrating an example of an enhanced PUCCH transmission with spatial relation cycling.

FIG. 6 is a diagram illustrating an example of an enhanced PUCCH transmission with spatial relation cycling. A WTRU may be configured with a number of PUCCH repetitions. A WTRU may cycle over configured spatial relation cycling for a PUCCH repetition transmission (e.g., each PUCCH repetition transmission).

In examples, a PUCCH resource ID (e.g., each PUCCH resource ID) may be configured with multiple (e.g., eight) PUCCH spatial relation information, e.g., represented by a code point in a MAC CE. Spatial information configured in a code point (e.g., each code point) may be applied for a PUCCH transmission (e.g., each PUCCH transmission). A WTRU may determine from the MAC CE (e.g., one of the reserved bits in the MAC CE) whether to apply spatial cycling for PUCCH repetition or the active spatial relation (e.g., only the active spatial relation).

In examples, a WTRU may be configured with multiple PUCCH-SpatialRelationInfo. A codepoint of configuration (e.g., each codepoint of configuration) may represent one or more states of a spatial domain filter. A codepoint may be indicated to a WTRU. A WTRU may apply spatial domain filters represented by different states in the codepoint on each repetition of PUCCH. Application of spatial domain filters indicated by a state (e.g., each state) may be, for example, sequential (e.g., based on the order of states or another predetermined pattern known to a WTRU and gNB).

A WTRU may (e.g., as shown by example in FIG. 6) transmit PUCCH repetitions, for example, by considering one or more symbols as guard time (TG) between transmissions, e.g., to allow sufficient time for re-tuning spatial filters.

In examples, a WTRU may be configured with multiple beams (e.g., multiple PUCCH-spatialRelationInfo, spatial domain filter, etc.) for the transmission of PUCCH with N repetitions. A PUCCH transmission (e.g., each PUCCH transmission) of N repetition may be associated with a (e.g., one) of the configured beams. A beam may be determined, for example, as a function of: a symbol index (e.g., a starting symbol index within a slot); and/or a PUCCH transmission number (e.g., i-th transmission of N repetition, where the i may be referred to as the PUCCH transmission number).

A WTRU may be configured with a number of PUCCH repetitions. A PUCCH repetition (e.g., each PUCCH repetition) may be associated with PUCCH spatial relation information (e.g., a beam). A WTRU may determine a subset of PUCCH repetitions for transmission, for example, based on one or more of the following: a measurement of an associated downlink reference signal in each PUCCH spatial relation information and/or a power back-off level of a PUCCH transmission associated with PUCCH spatial relation information.

A WTRU may determine a subset of PUCCH repetitions for transmission, for example, based on measurement of an associated downlink reference signal in a PUCCH spatial relation information (e.g., each PUCCH spatial relation information). For example, one or more downlink reference signals may be associated with one or more PUCCH spatial relation information. A WTRU may determine a subset based on a measurement. For example, a WTRU may select a subset of repetitions associated with PUCCH spatial relation information with a measurement higher than a threshold. A DL reference signal associated with an SRI may be used for DL measurement, for example, if an SRI is used as PUCCH spatial relation information.

A WTRU may determine a subset of PUCCH repetitions for transmission, for example, based on a power back-off level of a PUCCH transmission associated with PUCCH spatial relation information, e.g., due to a maximum permissible exposure (MPE). For example, a WTRU may make a determination (e.g., decide) to skip transmitting a PUCCH within PUCCH repetitions, for example, if an associated PUCCH transmission power is less than a threshold or if a power back off level is higher than a threshold (e.g., due to MPE), based on associated PUCCH spatial relation information.

A WTRU may determine a different PUCCH resource indicator (PRI) and spatial relations for PUCCH repetitions. For example, a WTRU may use a PRI value to determine which PUCCH resource configuration to use. PRI may be a one-to-one index to a PUCCH resource. A WTRU may receive a PRI, for example, in a DCI, and/or a WTRU may receive PRI in a RACH procedure (e.g., msgB or msg4).

A WTRU may determine PUCCH spatial relations and a PRI, for example.

A WTRU may determine PUCCH spatial relations and a PRI, for example, through an association between a PRI value and a spatial filter. For example, a WTRU may receive a PRI. A PRI may be associated with a plurality of spatial filters. A WTRU may be triggered to transmit multiple PUCCH copies using the PRI. A WTRU may use multiple different spatial filters associated with a PRI for the multiple copies. An association between PRI and spatial filters may be, for example, preconfigured. A PUCCH configuration may be enabled with frequency hopping. A WTRU may determine a different spatial relation for each hop.

A WTRU may determine PUCCH spatial relations and a PRI, for example, through a plurality of PRI values. A PRI (e.g., each PRI) may be associated with a spatial relation. For example, a WTRU may receive a pair (e.g., PRI_i1, PRI_i2). A WTRU may determine, for example, whether to use PRI_i1 for repetition i1 (e.g., with SRI_i1 associated) and PRI_i2 for repetition i2 (e.g., with SRI_i2 associated). An SRI may be associated with a PRI, for example, as part of a configuration.

A WTRU may determine PUCCH spatial relations and a PRI, for example, based on an offset. A WTRU may receive an offset (e.g., delta_K). A spatial relation and PRI for a repetition may be determined, for example, based on one pair of (PRI, SRI). For example, a WTRU may make a determination to use PRI_i1=PRI with associated SRI_i1=SRI for repetition i1. The WTRU may decide to use PRI_i2=PRI+delta_K with associated SRI_i2=SRI for repetition i2, or the WTRU may decide to use PRI_i2=PRI with SRI_i2=SRI+delta_K for repetition i2. For example, a WTRU may use Eq. 1 with delta_K to determine a PUCCH resource:

$$r_{PUCCH} = \frac{2n_{CCE,p}}{N_{CCE,p}} + \Delta_{PRI} + \text{delta\_K} \qquad \text{Eq. 1}$$

where $N_{CCE,p}$ may be a number of CCEs in CORESET p of a PDCCH reception for a DCI format, $n_{CCE,p}$ may be an index of a first CCE for a PDCCH reception, and $\Delta_{PRI}$ may be a value of a PUCCH resource indicator field in a DCI format.

A WTRU may select K1 and spatial relations for PUCCH repetitions. A WTRU may use a K1 value, for example, to determine when to send a PUCCH in time. K1 may be a time offset between a PDSCH to PUCCH transmission. A WTRU may receive a K1 value (e.g., one K1 value), for example, in a DCI, or a WTRU may receive K1, for example, in a RACH procedure (e.g., msgB or msg4).

A WTRU may determine PUCCH spatial relations, for example, by using a K1 value.

A WTRU may determine PUCCH spatial relations, for example, through an association between a K1 value and a spatial relation. For example, a WTRU may receive multiple K1 values (e.g., two K1 values) and may send the PUCCH in multiple different time instants (e.g., two different time instants) identified by the multiple K1 values (e.g., two K1 values). A K1 (e.g., each K1) may be associated with a spatial filter. A WTRU may determine which spatial transmission filter to use for a transmission (e.g., each transmission), for example, based on a K1 value. For example, a K1 (e.g., each K1) may be linked to an SSB, a CSI-RS, or an SRS, from which the WTRU may determine the QCL information.

A WTRU may determine PUCCH spatial relations, for example, through an association between a TCI codepoint and one or more K1 values. For example, a WTRU may receive a TCI codepoint linked to multiple TCI states (e.g., two TCI states). A WTRU may, for example, determine the codepoint to be configured with multiple K1 values (e.g., two K1 values), or each TCI state may be configured with a K1 value. A WTRU may be triggered to send multiple repetitions according to the number of K1 values linked to the TCI codepoint or number of TCI states.

In examples, a K1 value (e.g., one K1 value) and an offset K1_offset may be linked to multiple PUCCH resources. A PUCCH resource (e.g., each PUCCH resource) may be configured with a spatial relation. In an example, a WTRU may decide to send the first PUCCH repetition with time offset K1 on PUCCH resource 1. The WTRU may send the second PUCCH repetition with time offset K1+K1_offset on PUCCH resource 2. The time offset K1_offset may be indicated (e.g., dynamically indicated) or may be a configurable value.

Figure 7:
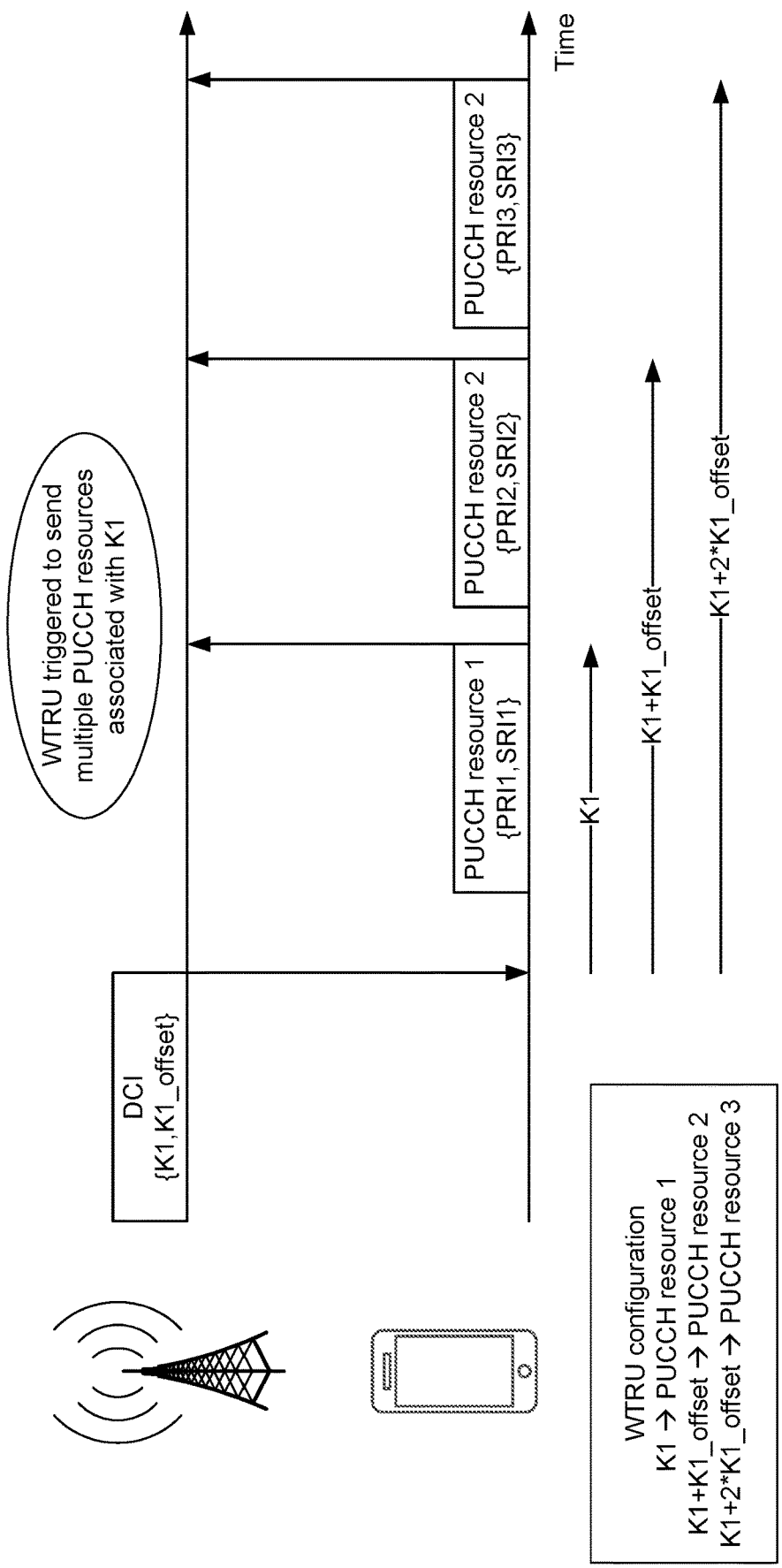
FIG. 7 is a diagram illustrating an example of a resource configuration for PUCCH repetition based on a K1 value.

FIG. 7 is a diagram illustrating an example of a resource configuration for PUCCH repetition based on a K1 value. FIG. 7 shows an example where a WTRU determines PUCCH resources based on a K1 indication and uses an offset to trigger the WTRU to send multiple repetitions, e.g., each having a separate configuration.

A WTRU may determine PUCCH spatial relations, for example, by using a K1 value. A WTRU may use an offset index to determine the spatial relations per TRP. In examples, i1 may be an SRI indicated in a DCI. A WTRU may decide to use i1 for a first repetition, i2=i1+(i3−1)*SRI_offset for a second repetition (e.g., where SRI_offset may be indicated in the DCI or preconfigured) and i3 is an index of the transmission (e.g., repetition index, TRP index, CORESETpoolindex).

A WTRU may determine PUCCH spatial relations, for example, by using a K1 value. The time or SRI offset may be indicated, for example, dynamically in a DCI, in a msg3 or msgB, or as part of a MAC-CE sent to update the spatial relations of PUCCH resources.

A WTRU may be configured to determine a number of repetitions and spatial filter patterns. A WTRU may determine (e.g., may dynamically determine) the number of repetitions and the spatial filter pattern such as, for example, SRI, for the PUCCH based on a look up table. The table may be preconfigured (e.g., via RRC) as part of the PUCCH configuration. The SRI configuration may consist of a value or a pattern of SRIs (e.g., SRI1-SRI2). SRI values/patterns may be determined for the PUCCH case. The WTRU may also determine the SRI values/pattern for PUSCH repetitions. The table may be configured for either a PUCCH or PUSCH configuration and may be used for either configuration. One table may be used for a PUCCH and PUSCH, or one table may be configured per PUCCH and PUSCH. The table may consist of a link between a repetition number and either an SRI value or a pattern of SRI values. The table may link one repetition number to more than one pattern of SRI values. The table may comprise links to SRI patterns. For PUCCH repetitions the table may be applicable to determining PRI values/patterns or a combination of SRI/PRI pairs. An SRI value/pattern may be linked to multiple PRI values/patterns, and the pair of SRI/PRI values/patterns to be used may be determined using, for example, techniques as described herein. A PRI value/pattern (e.g., one PRI value/pattern) may be linked to multiple SRI values/patterns.

A predetermined rule may be employed for selecting PUCCH repetition numbers and/or a pattern based on a parameter and/or a combination of parameters (e.g., as described herein). The TRP may be aware of the WTRU choice through the predetermined rule. The TRP may monitor for the number of repetitions and patterns based on the table and the rule configured with the table. The WTRU may switch between single and multi-TRP operation dynamically. The WTRU may determine to switch based on the RSRP difference between TRP1 and TRP2. If the difference is determined to be below a threshold, the WTRU may determine that it may be equally distant from the TRPs and may determine to use transmission towards multiple TRPs.

Figure 8:
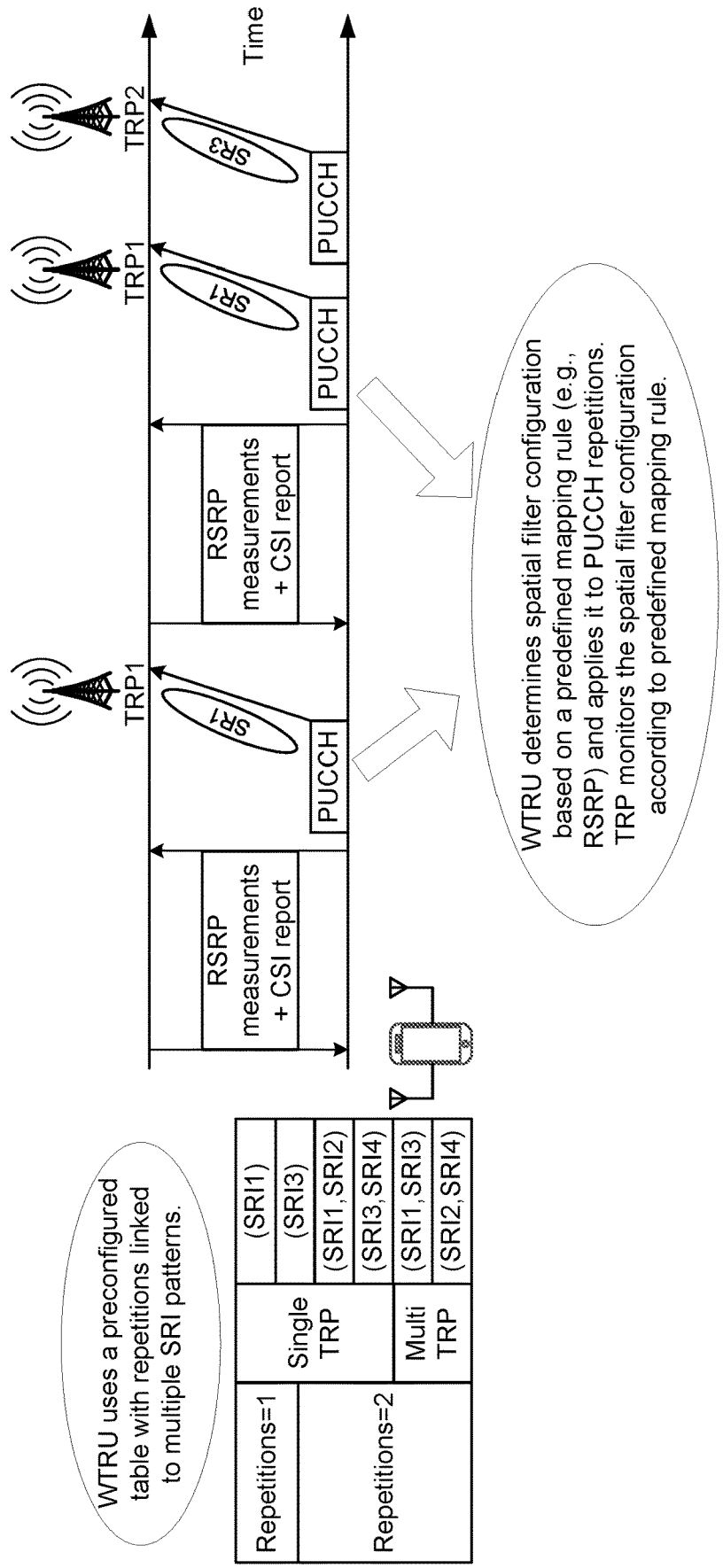
FIG. 8 is a diagram illustrating an example table linking repetitions and spatial filter patterns.

FIG. 8 illustrates example techniques for a WTRU preconfigured with a table that links repetitions and spatial filter patterns where each spatial filter may be determined by an SRI. Referring to FIG. 8, SRI1 and SRI2 may target TRP1. SRI3 and SRI4 may target TRP2. The WTRU may use a combination of parameters to select the appropriate repetition number, multi-TRP mode of operation, and pattern of spatial filter. The WTRU may make RSRP measurements and report to the TRP. The WTRU may determine that the RSRP is above a threshold which may be determined to be enough for one repetition. The WTRU may determine that the RSRP difference between TRP1 and TRP2 is above a threshold. The WTRU may determine that TRP1 may be used (e.g., preferably used). Based on the table and CSI report, TRP1 may determine that a next PUCCH transmission may be a single repetition sent from the WTRU with SRI1. For the next PUCCH transmission, the WTRU may select single TRP mode with one repetition and may use SRI1 spatial filter. The WTRU may make (e.g., may subsequently make) other RSRP measurements and may report the measurements to the TRP. The WTRU may determine that the RSRP difference between TRP1 and TRP2 is below a threshold. If the WTRU subsequently sends a PUCCH transmission, the WTRU may select multi-TRP mode with two repetitions and may use SRI1 and SRI3 patterns.

A WTRU may determine which entry to use one in the table, which may consists of a combination of a repetition number and/or a pattern, based on one or more parameters. The parameters may be associated with one or more of the following: a signal quality; a panel configuration; a TRP mode of operation; previous transmissions; a subframe number; a group of RS; a PRI (associated with PUCCH case); and/or a repetition type.

The WTRU may determine which entry in the table to use based on a parameter associated with signal quality. The WTRU may determine to use the SRIs if an RSRP is above a threshold.

The WTRU may determine which entry in the table to use based on a parameter associated with the panel configuration. The WTRU may determine to use SRIs sent from the same or different panels. A WTRU may determine to change the number of repetitions, e.g., based on the number of activated panels. If a WTRU employs two panels, the WTRU may use two repetitions per panel. If one panel is deactivated, the WTRU may switch to four repetitions on a single panel.

The WTRU may determine which entry in the table to use based on a parameter associated with a TRP mode of operation. The WTRU may determine to use SRIs based on whether the WTRU is sending to one TRP or multi-TRP. The WTRU may use a pattern with SRIs targeting one TRP, or may use a pattern with one SRI per TRP.

The WTRU may determine which entry in the table to use based on a parameter associated with a previous transmission (e.g., the last transmission). The WTRU may determine to use the pattern which contains an SRI used in a previously scheduled transmission (e.g., in a DCI, or configured grant) or used in a previous UL transmission (e.g., last UL transmission) which may have been, for example, a RACH.

The WTRU may determine which entry in the table to use based on a parameter associated with a time, duration of time, etc. (e.g., using a timer). The WTRU may determine to use a repetition number or pattern based on a time, duration of time, etc. (e.g., using a timer). For example, the WTRU may determine to use the pattern that includes the SRIs used within the last T subframes or TTI.

The WTRU may determine which entry in the table to use based on a parameter associated with a subframe number. The WTRU may determine SRIs based on the SFI pattern or on even/odd parity of slots. The WTRU may determine to use one SRI pattern if scheduled to start in an even slot.

The WTRU may determine which entry in the table to use based on a parameter associated with a group of RSs. The WTRU may determine to use SRIs which belong to the same RS group.

The WTRU may determine which entry in the table to use based on a parameter associated with PRI (e.g., in a PUCCH case). The WTRU may determine SRIs based on the associated PRI value. A PRI value/pattern (e.g., each PRI value/pattern) may be linked to multiple SRI values. The WTRU may determine to use one of the SRI values/patterns linked to the PRI (e.g., SRI1,SRI2) if transmitting with PRI1. The WTRU may determine which PRI value/pattern and number of PRIs to use based on the SRI value/pattern.

The WTRU may determine which entry in the table to use based on an associated repetition type A/B (e.g., in a PUSCH case). The WTRU may determine the SRI configuration to use based on the configured repetition type. For example, if the repetition type is type A, the WTRU may determine to use SRI pattern 1. If the repetition type is type B, the WTRU may use SRI pattern 2. If the repetition type is type B, the WTRU may determine the pattern depending on whether or not the number of nominal repetition is equal to actual repetitions.

A WTRU may be configured to address PUCCH repetitions that overlap with PUSCH. A set of PUCCH repetitions may overlap with one or more PUSCH transmissions or PUSCH repetitions. The WTRU may multiplex uplink control information (UCI) of a PUCCH repetition with an overlapping PUSCH transmission, e.g., if at least one of the following conditions is satisfied: a payload size of PUCCH is below a threshold, where the threshold may be pre-defined (e.g., 12 bits or 2 bits) and may correspond to a maximum payload size for a certain type of coding such as, for example, polar coding or block coding; the coding scheme for the encoding of UCI is one of a set of allowed coding schemes for multiplexing with PUCCH repetition (e.g., block coding); the number of coded bits for UCI after rate matching is the same across PUCCH repetitions and PUSCH repetitions or transmissions (e.g., all PUCCH repetitions and PUSCH repetitions or transmissions); or each PUCCH repetition would overlap with a PUSCH transmission or repetition and multiplexing conditions, which may be related to a timeline, are satisfied for each PUCCH repetition. If at least one of the above conditions is satisfied, PUSCH transmission may not be cancelled and the receiver at the network side may be able to combine receptions from the multiple UCI transmissions over PUCCH or PUSCH.

Additional conditions related to priority index of the PUCCH and PUSCH transmissions may be satisfied for multiplexing to take place. A PUCCH or PUSCH transmission may be dropped if its priority index is lower than the overlapping transmission and if a latency and/or a reliability requirement of the transmission with a higher priority index may not be met if multiplexing were to take place.

If the priority index of PUCCH repetition and PUSCH transmission or repetition is the same, the WTRU may drop an overlapping PUSCH transmission or repetition, e.g., in case the at least one condition is not satisfied.

PUCCH/PUSCH multiplexing and repetition may be provided. Among PUCCH formats, PUCCH format 2 may be based on OFDM transmission, PUCCH formats 0 and 1 may be sequence-based, and formats 3 and 4 may be based on DFT-OFDM transmission. PUCCH format 2 may have a short duration in time (e.g., similar to PUCCH format 0).

In examples, enhanced PUCCH transmission may be based on repetition of PUCCH format 2. One or more occasions of PUCCH repetition may occur simultaneously as PUSCH transmission. PUCCH repetition may occur (e.g., if an enhanced PUCCH transmission is activated), for example, based on a fixed or predefined pattern relative to PUCCH resources indicated by a PUCCH resource indicator. For example, a PUCCH transmission may be repeated on the same frequency location as PUCCH resources indicated by a PUCCH resource indicator. PUCCH repetition may occur based on a hopping pattern, for example, with a configurable offset relative to the actual (e.g., original, non-repetitious) PUCCH transmission.

In examples (e.g., if repetition of a PUCCH transmission is simultaneous with PUSCH transmission), spatial domain filters for PUCCH repetition may be replaced with a spatial domain filter for the ongoing PUSCH transmission. UCI may be multiplexed with PUSCH data (e.g., in NR). A PUSCH payload may be punctured or rate matched, for example, depending on the size of the UCI. In examples, UCI transmission may be enhanced, for example, by employing a repetition mechanism for the actual UCI. A WTRU may enhance UCI transmission, for example, by using repetition (e.g., simple repetition) of a HARQ and/or SR bits or using a codeword. A WTRU may enhance reliability of UCI transmission, for example, by using more than one bit to transmit HARQ and/or SR feedback. A WTRU may use a codeword composed of several bits corresponding to a UCI content (e.g., each UCI content). UCI multiplexing with PUSCH may be used for UCI repetition (e.g., only used for UCI repetition), for example, in addition to the transmission of actual PUCCH.

PUSCH enhancements disclosed herein may be implemented in systems, devices and/or methods.

A WTRU may transmit multiple copies, e.g., to increase the reliability of a PUSCH transmission. A copy (e.g., each copy) may be transmitted, for example, with a different spatial relation, time, or frequency resource allocation, e.g., to improve receive diversity. A WTRU may determine a spatial transmission filter.

A WTRU may use a spatial domain resource allocation table. A WTRU may determine spatial relations for uplink transmissions and downlink receptions. Examples described to determine spatial relations for uplink transmissions on the PUSCH may be used to determine multiple spatial relations for downlink receptions on PDSCH. Use of the word PUSCH may be replaced by PDSCH and a similar implementation may be applied for downlink.

A WTRU may determine spatial relations between PUSCH repetitions and spatial transmission filters, for example, based on a spatial domain resource allocation (SDRA) table. An SDRA table may be organized, for example, by a number of repetitions (e.g., row 1 for single repetitions, row 2 for two repetitions, and so on). Table 1 is an example of an SDRA table. Each row may have N_sets sub-entries, where N_sets may be the number of spatial relation sets configured per repetition (e.g., see FIGS. 8, 10, and 11).

TABLE 1

Example of an SDRA table

| Number of repetitions | SDRA bit field | Spatial relation set |
|---|---|---|
| 1 | 0 | {RS_1} |
|   | 1 | {RS_2} |
| 2 | 0 | {(RS_1, RS_2)} |
|   | 1 | {(RS_3, RS_4)} |

Figure 9:
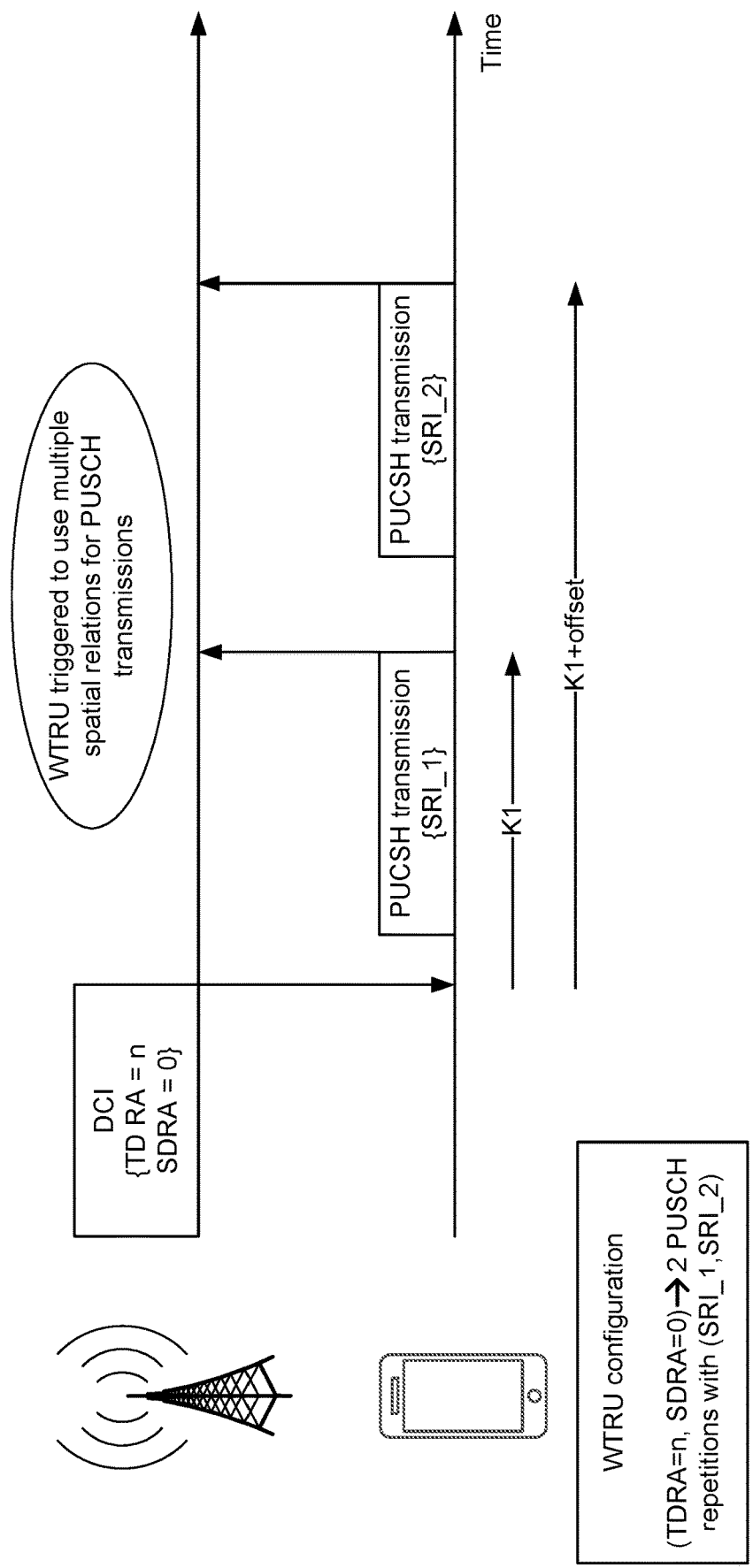
FIG. 9 is a diagram illustrating an example of a resource configuration for PUSCH repetition based on an SDRA and a TDRA.

A WTRU may be triggered to use a spatial relation set (e.g., one spatial relation set), for example, based on a bit field K_SDRA of length log 2(N_sets) in the DCI scheduling the PUSCH transmission (e.g., as shown in FIG. 9) and/or the RS index provided in the DCI.

FIG. 9 is a diagram illustrating an example of a resource configuration for PUCCH repetition based on one or more of an SDRA and a TDRA. The TDRA may be used by a WTRU to determine the number of repetitions. In examples, resource configuration may refer to a spatial filter association to the repetitions. A WTRU may be triggered to use a spatial relation set based on, for example, a bit field K_SDRA of length log 2(N_sets) in the DCI scheduling the PUSCH (e.g., as shown by example in FIG. 9). A WTRU may determine that the WTRU's PUSCH transmission is configured with two repetitions, e.g., from a TDRA. In examples, a WTRU may be configured with the an SDRA table (e.g., the example SDRA table in Table 1) and look up a row (e.g., row 2) corresponding to two repetitions. The row may be configured with N_sets of spatial relation sets: {(RS_1, RS_2), (RS_3, RS_4)}. The SDRA bit field received may have a value of 0. A WTRU may be triggered to use the first spatial relation set (RS_1, RS_2), e.g., based on the SDRA bit field having a value of 0. A WTRU may determine the spatial transmission filter for repetition 1 and 2 is based on RS_1 and RS_2, respectively.

A WTRU may be triggered to use a spatial relation set based on, for example, the RS index provided in the DCI. Spatial relation sets may be defined, for example, so that each set may be linked one-to-one with an RS. A WTRU may determine a row of an SDRA table, for example, based on the number of repetitions. A WTRU may decide to use the spatial relation set that contains the RS index. For example, the RSs in the spatial relation sets may be comprised of SRIs. A WTRU may receive an SRI in a DCI. A WTRU may decide to send two repetitions. A WTRU may determine (e.g., based on an SDRA table as shown in Table 1) that the spatial relation sets linked to two repetitions may be configured as {(SRI_1, SRI_2), (SRI_3, SRI_4)}. A WTRU may receive SRI_1 in a DCI. A WTRU may decide to use the spatial relation set that contains SRI_1, which is (SRI_1, SRI_2), e.g., if the WTRU receives SRI_1 in the DCI.

Spatial relation sets in an SDRA table may be reconfigured, for example, if a WTRU or TRP determines that updated spatial relation may provide better performance. A TRP may update spatial relation sets, for example, through a MAC-CE containing a K_SDRA value. A WTRU may provide spatial relation sets with an uplink MAC-CE. For example, a WTRU may decide to deactivate a panel. A WTRU may suggest spatial relation sets to update an SDRA table, for example, so that the spatial relation sets (e.g., all the spatial relation sets) are configured for the activated panel.

A WTRU may determine spatial relations, for example, based on an enhanced TDRA configuration. A WTRU may be configured with a pusch-AllocationList table. A row (e.g., each row) of the table may be configured with a spatial relation set. A WTRU may be triggered to use multiple spatial relations from the set, for example, if the PUSCH allocation is configured with repetitions. A WTRU may decide to apply the spatial relations from the list, for example, by associating a repetition index (e.g., one repetition index) with a value (e.g., one value) in the spatial relation set. A switching timing offset may be configured, for example, to allow the WTRU to switch the WTRU's spatial relation for each transmission. For example, a WTRU may receive a TDRA pointing to row n of a pusch-AllocationList and the row may be configured with a K2 value, a mapping Type B, a start and length indicator value (SLIV), a switching timing offset, and a spatial relation set spatialRelationSet=[RS_1, RS_2, . . . ]. A WTRU may decide to use the spatial relations for the repetitions in the corresponding order of the list. For example, repetition 1 uses RS1, repetition 2 uses RS2, and so on. A WTRU may decide to apply the switching timing offset in between each repetition while switching the WTRU's spatial relation. A TRP may expect to receive the repetitions with the designated spatial relations and at the timing with the offset applied in between.

PUSCH repetitions may be scheduled with different spatial relations. A WTRU may use a K2 value, for example, to determine when to send a PUSCH in time. K2 may be a time offset between a PDCCH to PUSCH transmission. A WTRU may receive a K2 value (e.g., one K2 value), for example, in a DCI scheduling a PUSCH transmission. A WTRU may decide to transmit multiple PUSCH repetitions with different spatial filters. For example, a WTRU may alternate the WTRU's transmission towards several receiving TRPs. A spatial filter used for each TRP may be chosen differently, for example, to maximize the received signal. A WTRU may use a time gap in between repetitions, for example, to determine when to send the repetitions and to allow the WTRU to change the WTRU's spatial filter characteristics.

In an example, a WTRU may determine a K2 value and PUSCH spatial relations for multiple PUSCH repetitions.

A WTRU may determine a K2 value and PUSCH spatial relations for multiple PUSCH repetitions, for example, through an association between a K2 value and a spatial relation. For example, a WTRU may receive multiple K2 values. A K2 value (e.g., each K2 value) may be associated with a spatial filter. For example, a WTRU may receive multiple (e.g., two) K2 values in a DCI scheduling a PUSCH transmission. A WTRU may send a PUSCH transmission in multiple (e.g., two) different time instants identified by the multiple (e.g., two) K2 values. A K2 value (e.g., each K2 value) may be associated with a spatial filter, for example, so that the WTRU may determine which spatial transmission filter to use for a repetition (e.g., each repetition) based on the K2 value.

A WTRU may determine a K2 value and PUSCH spatial relations for multiple PUSCH repetitions, for example, through an association between a UL TCI codepoint and K2 values. For example, a WTRU may receive a UL TCI codepoint linked to multiple (e.g., two) TCI states. The codepoint may be linked to multiple K2 values. A WTRU may use the multiple K2 values to send the PUSCH repetitions at different time instances. The WTRU may determine the WTRU's spatial filter, for example, based on the UL TCI states linked to the TCI codepoint. A K2 value may be linked to a TCI state.

A WTRU may receive a K2 value (e.g., one K2 value) and an offset, K2_offset, which may be used by the WTRU to determine when to send PUSCH repetitions. A WTRU may decide to send a first PUSCH repetition with time offset K2, and to send a second PUSCH repetition with time offset K2+K2_offset. The time offset K2_offset may be indicated (e.g., dynamically indicated) in a DCI or may be a configurable value. A WTRU may decide to use the offset, for example, if the WTRU is scheduled with multiple repetitions to multiple TRPs. A WTRU may decide to use the spatial relation (e.g., provided in a DCI) for the repetitions, or the offset may be linked to a spatial relation. For example, a WTRU may apply the offset as: K2=K2_DCI+(i3−1)*K2_offset, where K2 may be an offset used for repetition, K2_DCI may be a value indicated in a DCI, i3 may be an index of the i3-th transmission (e.g., repetition index, TRP index, coresetpoolindex), and K2_offset may be the offset. A WTRU may determine a time slot to use for the i3-th transmission, e.g., with 3.

A WTRU may determine spatial filters for a repetition transmission, for example.

A WTRU may use an offset index to determine spatial relations included in a DCI. For example, i1 may be an SRI indicated in a DCI. A WTRU may decide to use i1 for a first repetition, i2=i1+(i3−1)*SRI_offset for a second repetition (e.g., where SRI_offset may be indicated in a DCI or may be preconfigured) and 3 may be an index of the i3-th transmission (e.g., repetition index, TRP index, coresetpoolindex).

A WTRU may be preconfigured with a pattern of spatial relations, e.g., to use for multiple relations. A WTRU may be triggered to use a pattern, for example, if the WTRU receives a TCI codepoint with multiple TCI states linked.

A WTRU may determine spatial filters implicitly based on DCI fields. A spatial filter index, number of repetitions, single/multi-TRP mode, and/or spatial filter pattern may be referred to as a spatial filter configuration. The WTRU may be scheduled to send the PUSCH repetitions with a DCI which may not signal (e.g., explicitly signal) the spatial filters, number of repetitions, or the spatial filter pattern.

Figure 10:
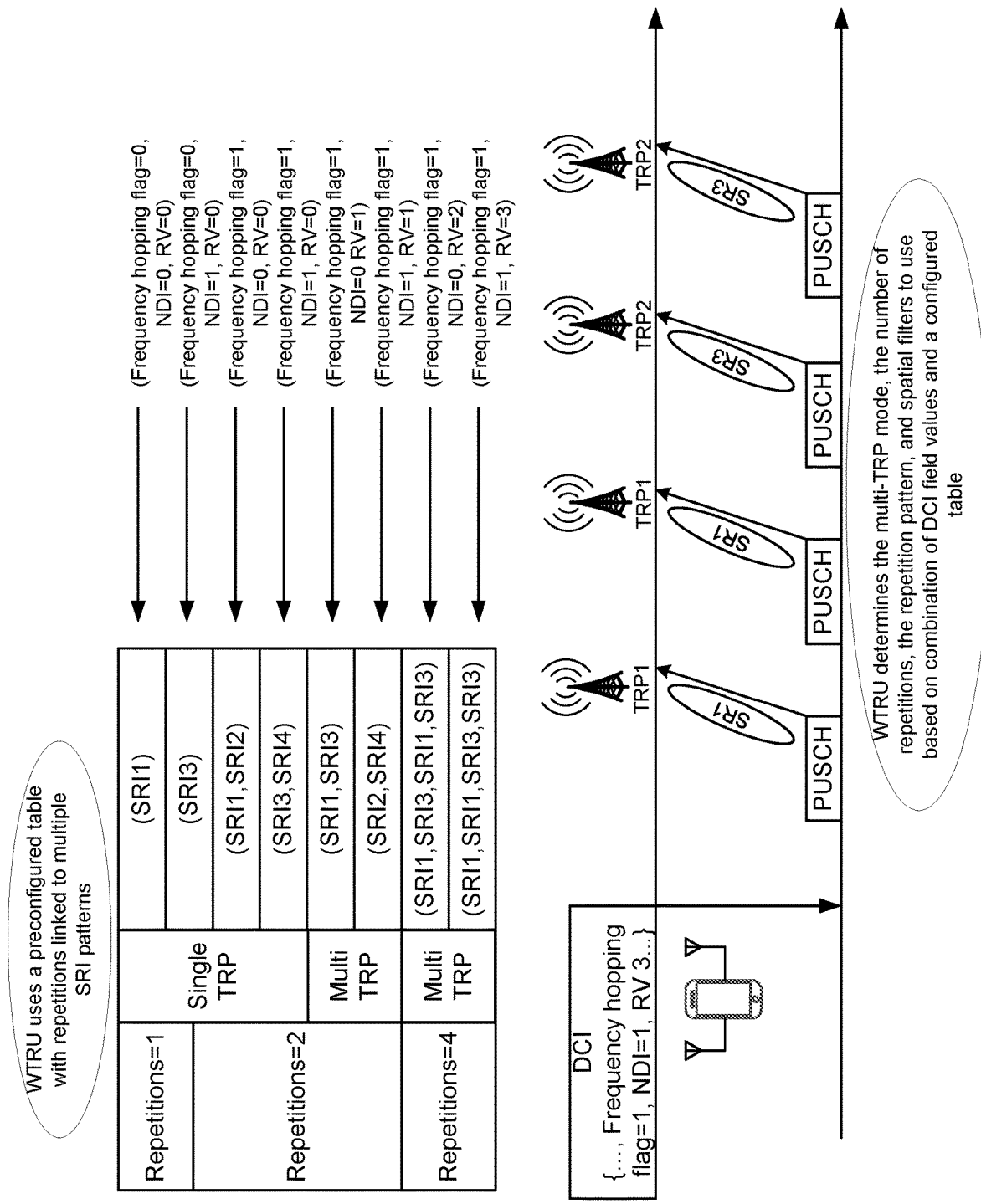
FIG. 10 is a diagram illustrating an example DCI with fields linking to a table with repetitions and spatial filter patterns.

The WTRU may determine (e.g., implicitly determine) the spatial filter configuration, e.g., through one or a combination of fields in the DCI and a link from the fields to a table of spatial filter configurations as illustrated in FIG. 10. One or more of the DCI fields may be linked to a spatial filter configuration. The WTRU may determine the spatial filter configuration based on one or a combination of DCI field states. The DCI fields may include a new data indicator (NDI), a frequency hopping flag, an MCS, a redundancy value (RV), a BWP indicator, a UL or supplementary UL (SUL) indicator, and the like. If the WTRU receives an NDI=0 field state, the WTRU may use pattern1 (e.g., SRI1-SRI2). If the WTRU receives an NDI=1 field state, the WTRU may use SRI1-SRI2-SRI3-SRI4. The WTRU may use a combination of field states to determine the spatial filter configuration. If the WTRU receives data indicating NDI=0 and RV=0, the WTRU may determine to use SRI1-SRI2. If the WTRU receives data indicating NDI=0 and RV=1, the WTRU may determine to use SRI3-SRI4. The DCI field states may be encoded into a bitstream. A value of '00' in the bitstream may be used to correspond to DCI field NDI equaling zero (NDI=0) and DCI field RV equaling zero (RV=0). A value of '01' in the bitstream may be used to correspond to DCI field NDI equaling zero (NDI=0) and DCI field RV equaling one (RV=1). Each bitstream may map to the spatial filter configuration table. The mapping may be reconfigured, for example, through MAC-CE.

The WTRU may determine how to map the spatial filter configuration to the repetitions one-to-one, or the WTRU may determine a different pattern based on the DCI fields. The WTRU may determine that the spatial configuration pattern is SRI1-SRI2 with four repetitions. If RV is determined to be equal to zero (RV=0), the WTRU may apply SRI1-SRI1-SRI2-SRI2. If RV is determined to be equal to one (RV=1), the WTRU may apply SRI1-SRI2-SRI1-SRI2. The pattern may be linked to the number of repetitions so the WTRU may determine to use one pattern with two repetitions and a different pattern if sending four repetitions.

The fields may be linked to an entry in a table such as the SDRA table described in connection with Table 1. The WTRU may receive an explicit SDRA indication in the DCI, e.g., which may indicate a subset of SRI values/patterns. The WTRU may determine one value/pattern from the subset, e.g., using a field value from the DCI. A preconfigured table may be used (e.g., as depicted in FIG. 10) if there is no indication (e.g., explicit indication) in the DCI of spatial filter configurations. The TRP may be used to configure the link between DCI values and spatial filter configuration table entries. The WTRU may derive (e.g., may implicitly derive) the spatial filter configurations based on one or many DCI fields. The WTRU may receive a DCI with a frequency hopping flag equal to one (frequency hopping flag=1), an NDI equal to zero (NDI=0), and an RV equal to three (RV=3). The WTRU may map those DCI fields to a table with preconfigured spatial filter configurations. The table may be part of a PUSCH configuration or linked to the PUSCH configuration which may be, for example, used for PUCCH. The WTRU may determine to use four repetitions, towards multiple TRPs, with SRI1 and SRI3 in the pattern SRI1-SRI1-SRI3-SRI3. If the TRP schedules the WTRU with the DCI, the TRP may monitor for the WTRU repetitions according to the established link in the table. The WTRU may provide feedback through CSI reports or beam failure recovery (BFR) (e.g., BFR MAC-CE). The TRP may change the spatial filter configurations in the table according to the WTRU feedback. MAC-CE or RRC reconfiguration may be used to update the table.

The DCI fields may map to more than one pattern. The WTRU may determine to use one pattern over another, e.g., based on a parameter. The WTRU may determine to use one or more patterns based on one or more of the following: channel quality (RSRP, SINR, and the like); a last used spatial filter configuration; a default configuration (e.g., use single TRP by default); a time, duration of time, timer, etc. (e.g., between DCI and scheduled PUSCH); and/or a sub-frame index where DCI is received.

A WTRU may use a configured grant with multiple spatial relations. A WTRU may be (pre-)configured to perform PUSCH transmissions in a configured grant (e.g., one configured grant), e.g., using a set of spatial relations. A WTRU may determine a spatial relations transmission pattern for a TB (e.g., each TB) and/or a configured grant (e.g., each configured grant), which may include, for example, one or more of the following: a set of spatial relations that may be used for a TB transmission (e.g., each TB transmission); a set of spatial relations that may be used for transmissions in a configured grant (e.g., each configured grant); a sequence of spatial relations that may be used for a resource in a bundle (e.g., each resource in a bundle) and/or a sequence of spatial relations that may be used for a bundle of resources (e.g., each bundle of resources), which may allow a WTRU to determine which spatial relations to use in each transmission resource; and/or a sequence of spatial relations that may be used for transmissions of a TB (e.g., one TB), which may allow the WTRU to determine which beam to use for a transmission (e.g., each transmission) of a TB (e.g., which spatial relations to use for the initial transmission, and which beam to use for each retransmission).

A spatial relations transmission pattern may be determined, for example, based on one or more of the following: a (pre-)configuration by the network; a number of repetitions of a TB in a configured grant; a time gap between consecutive transmissions (e.g., two consecutive transmissions) of a TB; a spatial relations set configured in the configured grant; and/or a QoS of data configured in the grant.

Spatial relations may be (pre-)configured by the network. A WTRU may determine a spatial relations transmission pattern, for example, based on a configured grant configuration. A WTRU may be configured with a spatial relations transmission pattern in a configured grant, which may be associated with a TB (e.g., each TB), a bundle of resources, and/or a period of a configured grant. For example, a WTRU may be (pre-)configured with a table of multiple spatial relations transmission patterns. A WTRU may be configured with an index in the table indicating which spatial relations transmission pattern to use.

A number of repetitions of a TB may be specified (e.g., in a configured grant). A WTRU may determine a spatial relations transmission pattern, for example, based on the number of repetitions of a TB in a configured grant. For example, a WTRU may be scheduled with a grant having a transmission bundle of repK resources (e.g., repK may give the number of repetitions to use when the WTRU uses the configured grant). A WTRU may decide to use a first beam for the first N transmissions and a second spatial relations for the remaining transmission of the bundle.

There may be a time gap between consecutive transmissions (e.g., two consecutive transmissions) of a TB. A WTRU may be configured with multiple sets of beams for a PUSCH transmission. A WTRU may determine which set of beams to use for transmissions in a bundle (e.g., one bundle) of a configured grant, for example, based on a time gap between resources in the bundle. A WTRU may use a first set of spatial relations (e.g., the first set of beams may be associated with one panel), for example, if the time gap is smaller than a threshold. The WTRU may use a second set of beams (e.g., the second set of beams may be associated with multiple antenna panels), for example, if the time gap is larger than the threshold.

A beam set may be configured in a grant. A WTRU may determine a spatial relations transmission pattern, for example, based on the beam set configured in the grant. A WTRU may determine which subset of beams may be used for transmissions in a bundle and/or for transmissions of a TB based on a set of beams configured for the configured grant. For example, a WTRU may be configured with a (e.g., one) set of beams (e.g., two beams) for transmission in a configured grant. A WTRU may decide to use (e.g., all) beams for transmissions of a TB or transmission within a bundle, for example, if the beam set is associated with a panel (e.g., one panel). The WTRU may decide to use a subset of beams (e.g., one subset of beams) associated with a panel (e.g., one panel) for transmissions of a TB or transmission within one bundle, for example, if the beam set is associated with multiple panels. This approach may restrict a WTRU to performing panel switching for transmission within a bundle (e.g., one bundle) and/or for the transmissions of a TB.

A beam transmission pattern may be determined based on a QoS of a TB. A WTRU may determine a beam transmission pattern, for example, based on a QoS of an associated TB, which may be determined, for example, based on one or more of the following: a priority of a logical channel (LCH) included in the TB and/or the reliability of data included in the TB. In examples, the priority of a TB may be determined as the highest priority of the LCH included in the TB. The reliability of the data included in the TB may be based on a packet error rate (PER). In an example, a LCH (e.g., each LCH) may be configured to one or more reliability values, which may be used to indicate a desired PER of data in the LCH. A WTRU may determine a reliability of a TB, for example, based on the highest reliability of the LCHs having data included in the TB. A WTRU may be configured with one or more reliability levels for a QoS flow (e.g., each QoS flow). A WTRU may determine a reliability of a TB, for example, based on a highest reliability of the flows included in the TB.

In an example, a WTRU may use a first beam pattern for a TB having a first range of priority. The WTRU may use a second beam pattern for a TB having a second range of priority. In examples, a WTRU may be configured with multiple (e.g., two) sets of LCHs. A first set of LCHs may be associated with high reliability data and a second set of LCHs may be associated with low reliability data. A WTRU may use a first beam set (e.g., one beam) for transmission of a TB having data from the second set of LCHs and may use the second beam set (e.g., with two associated panels) for transmission of a TB having data from at least one LCH in the first set of LCHs.

A WTRU may be configured to perform resource selection based on dynamic switching between single and multi-TRP transmission modes. In examples, FIG. 11 may illustrate the features described herein that are associated with resource selection based on dynamic switching between single and multi-TRP. For example, a WTRU may determine a repetition category based on indicated repetitions. The WTRU may determine (e.g., after the repetition category is determined) an SRI pattern from the multiple SRI patterns in the repetition category, e.g., based on signaled RV information (e.g., RV bits) and SDRA information (e.g., an SDRA bit).

Figure 11:
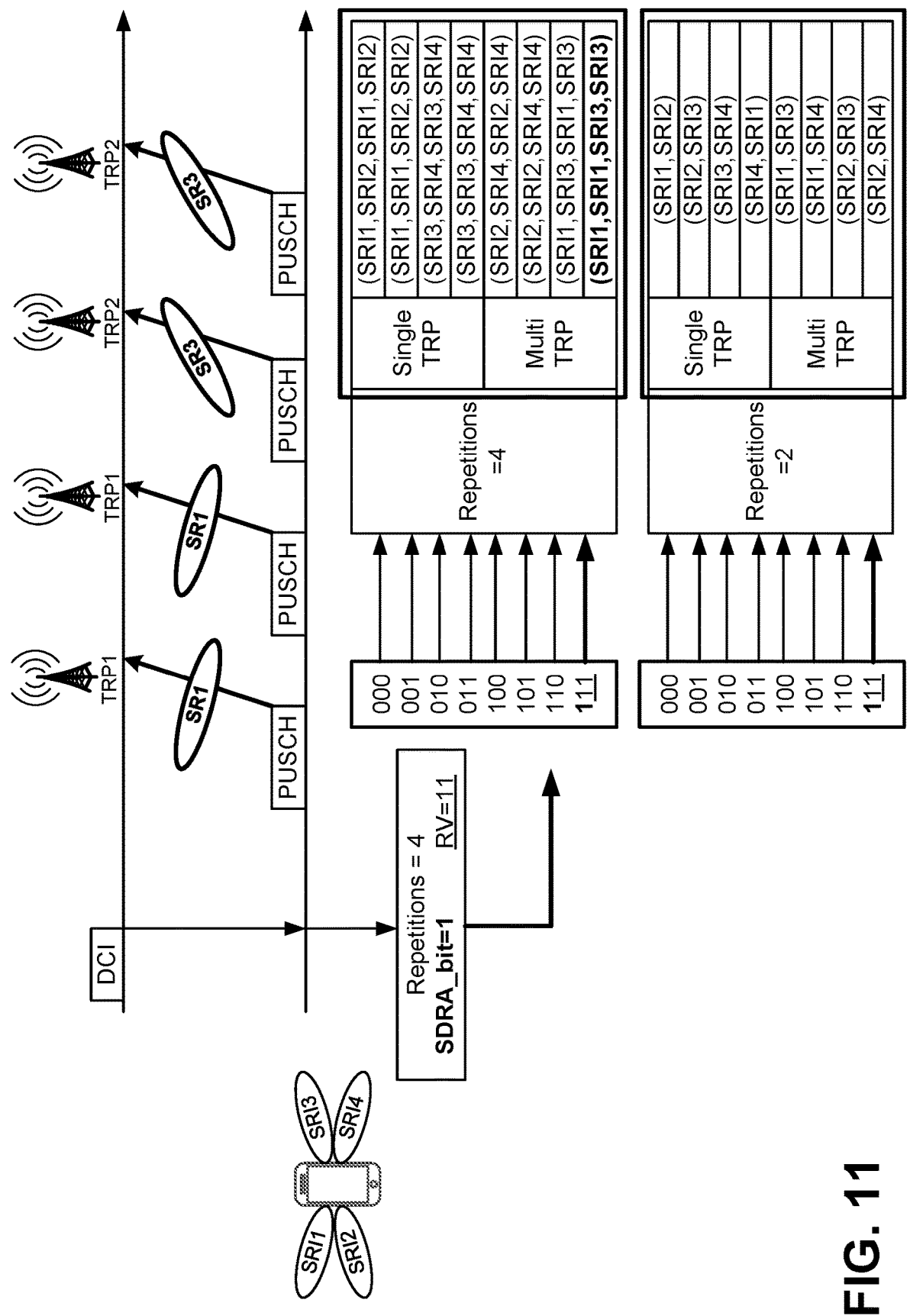
FIG. 11 illustrates resource selection based on dynamic switching between single and multi-TRP.

A WTRU may dynamically determine the transmission mode (e.g., single or multi-TRP, for example as shown in FIGS. 10 and 11) for a PUSCH transmission, e.g., a PUSCH transmission that is scheduled using a DCI, or for a PUCCH that is related to a DCI. The WTRU may determine a transmission mode based on, for example, a dynamic indication in the DCI, an explicit indication using, for example, SDRA, and/or an implicit indication (e.g., a DCI field combination), e.g., as described in exemplary FIGS. 10 and 11.

A WTRU may determine to employ either uplink single or multi-TRP mode transmission based on a scrambling used for the DCI. The scrambling may be partitioned into subsets of values where each subset may be associated with a transmission mode (e.g., single or multi-TRP mode).

A WTRU may use a scheduling type to determine whether to use single or multi-TRP transmission. A WTRU may determine that a subset of type 1 configured grants may be used for single TRP transmission and another subset may be used for multi-TRP transmission. A WTRU may determine that type 1 configured grants may be associated with single TRP transmission mode and that type 2 configured grants may be associated with multi-TRP transmission mode.

If a WTRU determines the transmission mode, the WTRU may not have values for other spatial relation parameters such as, for example, SRI, patterns, etc. The WTRU may determine values for the unknown parameters based on the transmission mode.

The WTRU may determine the transmission parameters for repetitions of PUCCH transmissions or PUSCH transmissions, e.g., based on the transmission mode (e.g., single or multi-TRP) or based on a threshold given by the number of TRPs (e.g., N_TRP>1).

The WTRU may determine that a default transmission mode is linked to the number of repetitions. The WTRU may determine that N_rep>2 may be configured for multi-TRP mode.

For N_rep>2 repetitions, if the WTRU determines that it is in multi-TRP mode, the WTRU may determine to employ the N_rep spatial relations (e.g., N_rep best spatial relations) across TRPs. The WTRU may be configured with a set (e.g., minimum set) of spatial relations to employ per TRP. Amongst the N_rep repetitions, the WTRU may determine to use at least one spatial relation from each TRP to ensure multi-TRPs are used.

The WTRU may determine to add switching gaps in between repetitions, e.g., depending on the transmission mode. If scheduled in multi-TRP mode, the WTRU may determine to add an additional switching gap when switching between SRIs (e.g., to account for panel switching time if each SRI is associated with a different panel and each panel with a TRP). The switching gaps may be associated with the repetition patterns, and the switching gaps may be activated depending on the number of TRPs. With one TRP, there may be no switching gap. For MTRPs, the WTRU may use a gap of T_gap seconds if it switches SRI.

The WTRU may determine default repetition patterns (e.g., cyclical or sequential) or default spatial relations (e.g., SRI) for each transmission mode. If the WTRU determines that single TRP mode is used, the WTRU may determine to use a cyclical repetition pattern (e.g., SRI1-SRI2-SRI1-SRI2). If the WTRU determines that multi-TRP is used, the WTRU may determine to use a sequential repetition pattern (e.g., SRI1-SRI1-SRI2-SRI2). These could be configured, for example, to lessen (e.g., minimize) the switching time between SRI changes assuming SRIs are on different panels.

The WTRU may determine the spatial relation sets for the repetitions based on whether the transmission is single or multi-TRP. If the WTRU determines the transmission is single TRP, the WTRU may determine to use two spatial relations, which may be, for example, the two best spatial relations, to the single TRP. If the WTRU determines the transmission is multi-TRP, the WTRU may determine to use a spatial relation (e.g., the best spatial relation) from TRP1 and a spatial relation (e.g., the best special relation) from TRP2. The WTRU may select a spatial relation, e.g., the best spatial relation, based at least on signal quality as indicated by, for example, reference signal received power (RSRP).

If the PUSCH transmission corresponds to a type 2 configured grant activated by DCI, the WTRU may dynamically switch between multiple configuredGrantConfigs. A WTRU may be configured with multiple configured grants. The WTRU may receive the DCI with a dynamic indication of switching from single to multi-TRP mode. The WTRU may determine to use a configured grant with spatial relation parameters for multi-TRP mode.

The WTRU may be configured with one configured grant and the configured grant may be associated with multiple spatial relations sets. The WTRU may determine that spatial relations may be partitioned into single and multi-TRP spatial relations, and the WTRU may determine which spatial relation to use depending on which transmission mode is used. A WTRU may have one configured grant type 1 which may be configured with one spatial relation pattern for single TRP mode, and one spatial relation pattern for multi-TRP mode. The WTRU may determine that the PUSCH transmission on the configured grant is for multi-TRP mode. The WTRU may determine to use the spatial relation for multi-TRP associated with the configured grant.

The WTRU may determine the transmission parameters based on the scrambling that is used. For type 2 configured grants, the grants may be partitioned according to the scrambling subsets (e.g., subsets of CS-RNTI). The WTRU may determine the spatial filters for single or multi-TRP transmission based on the configured link between subsets and indices.

The WTRU may, for a PUCCH transmission, determine the PUCCH repetition parameters based on whether single or multi-TRP mode is used.

For a PUCCH transmission carrying a CSI report, a WTRU may determine the PUCCH configuration or PRI depending on whether the CSI report is for single or multi-TRP mode. If the CSI report contains reports for reference signals associated with more than one TRP, the WTRU may determine to use a PUCCH spatial relation repetition configuration for multi-TRP with switching gaps and SRIs determined for multi-TRP.

The WTRU may determine the CSI report configuration to use based on the number of TRPs or number of repetitions. The WTRU may select resources (e.g., a group or non-group based report, the number of beams in the report, an RSRP or an SINR reporting) depending on whether the CSI report is repeated to a single TRP or to multiple TRPs. A WTRU may determine that it is reporting PUCCH repetitions to multiple TRPs. The WTRU may determine to report an SINR if N_TRP is greater than one (N_TRP>1). The WTRU may determine to report RSRP if reporting CSI to a single TRP.

If a WTRU receives the dynamic indication between single and multi-TRP, the WTRU may determine the spatial relation set to use for transmission and the transmission parameters. The WTRU may adjust its spatial transmission filter in order to apply them to PUCCH transmissions or PUSCH transmissions. The WTRU may send multiple repetitions where each repetition may use one of the spatial relations from the determined set.

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

What is claimed is:

1. A wireless transmit/receive unit (WTRU), the WTRU comprising:
a processor configured to:
obtain configuration information associated with multiple transmit/receive point (M-TRP) physical downlink control channel (PDCCH) transmission decoding, wherein the configuration information comprises a condition associated with performing M-TRP PDCCH transmission decoding, wherein the condition is associated with a radio network temporary identifier (RNTI), a control resource set identifier, a precoder granularity, and a mapping type;
determine to attempt to perform M-TRP PDCCH transmission decoding based on a determination that the condition is satisfied;
detect at least a first PDCCH transmission and a second PDCCH transmission, wherein the first PDCCH transmission is associated with a first transmit/receive point (TRP) and the second PDCCH transmission is associated with a second TRP;
attempt to perform M-TRP PDCCH transmission decoding for the first TRP and the second TRP;
determine that PDCCH transmission decoding associated with the first TRP has been successful, wherein the determination that PDCCH transmission decoding associated with the first TRP has been successful is based on a determination that the first PDCCH transmission associated with the first TRP has been successfully decoded;
determine that PDCCH transmission decoding associated with the second TRP has not been successful, wherein the determination that the PDCCH transmission decoding associated with the second TRP has not been successful is based on at least a determination that decoding the second PDCCH transmission associated with the second TRP has not been successful; and
send, to a base station, feedback via a physical uplink control channel (PUCCH) transmission, wherein the feedback comprises an RNTI associated with the first PDCCH transmission, a TRP index, and a control resource set index, wherein the RNTI associated with the first PDCCH transmission, the TRP index, and the control resource set index indicate that the PDCCH transmission decoding associated with the first TRP has been successful, wherein the feedback indicates an aggregation level associated with the PDCCH transmission decoding associated with the first TRP, and wherein the feedback indicates that M-TRP PDCCH transmission decoding was used.

2. The WTRU of claim 1, wherein the determination that the PDCCH transmission decoding associated with the second TRP has not been successful is further based on a determination that decoding a third PDCCH transmission associated with the second TRP has not been successful, wherein an attempt to decode the third PDCCH transmission associated with the second TRP is performed based on the determination that decoding the second PDCCH transmission associated with the second TRP has not been successful, wherein the feedback further indicates a repetition index associated with the second TRP.

3. The WTRU of claim 2, wherein the determination that the PDCCH transmission decoding associated with the second TRP has not been successful is further based on a determination that decoding soft-combined information associated with the second PDCCH transmission and the third PDCCH transmission has not been successful, wherein the feedback further indicates that decoding using soft-combined information associated with the second PDCCH transmission and third PDCCH transmission was unsuccessful.

4. The WTRU of claim 3, wherein the feedback further comprises an indication that indicates to switch to a single TRP transmission mode.

5. A method, the method comprising:

obtaining configuration information associated with multiple transmit/receive point (M-TRP) physical downlink control channel (PDCCH) transmission decoding, wherein the configuration information comprises a condition associated with performing M-TRP PDCCH transmission decoding, wherein the condition is associated with a radio network temporary identifier (RNTI), a control resource set identifier, a precoder granularity, and a mapping type;

determining to attempt to perform M-TRP PDCCH transmission decoding based on a determination that the condition is satisfied;

detecting at least a first PDCCH transmission and a second PDCCH transmission, wherein the first PDCCH transmission is associated with a first transmit/receive point (TRP) and the second PDCCH transmission is associated with a second TRP;

attempting to perform M-TRP PDCCH transmission decoding for the first TRP and the second TRP;

determining that PDCCH transmission decoding associated with the first TRP has been successful, wherein the determination that PDCCH transmission decoding associated with the first TRP has been successful is based on a determination that the first PDCCH transmission associated with the first TRP has been successfully decoded;

determining that PDCCH transmission decoding associated with the second TRP has not been successful, wherein the determination that the PDCCH transmission decoding associated with the second TRP has not been successful is based on at least a determination that decoding the second PDCCH transmission associated with the second TRP has not been successful; and sending, to a base station, feedback via a physical uplink control channel (PUCCH) transmission, wherein the feedback comprises an RNTI associated with the first PDCCH transmission, a TRP index, and a control resource set index, wherein the RNTI associated with the first PDCCH transmission, the TRP index, and the control resource set index indicate that the PDCCH transmission decoding associated with the first TRP has been successful, wherein the feedback indicates an aggregation level associated with the PDCCH transmission decoding associated with the first TRP, and wherein the feedback indicates that M-TRP PDCCH transmission decoding was used.

6. The method of claim 5, wherein the determination that the PDCCH transmission decoding associated with the second TRP has not been successful is further based on a determination that decoding a third PDCCH transmission associated with the second TRP has not been successful, wherein an attempt to decode the third PDCCH transmission associated with the second TRP is performed based on the determination that decoding the second PDCCH transmission associated with the second TRP has not been successful, wherein the feedback further indicates a repetition index associated with the second TRP.

7. The method of claim 6, wherein the determination that the PDCCH transmission decoding associated with the second TRP has not been successful is further based on a determination that decoding soft-combined information associated with the second PDCCH transmission and the third PDCCH transmission has not been successful, wherein the feedback further indicates that decoding using soft-combined information associated with the second PDCCH transmission and third PDCCH transmission was unsuccessful.

8. The method of claim 7, wherein the feedback further comprises an indication that indicates to switch to a single TRP transmission mode.

* * * * *